United States Patent
Kometani et al.

(10) Patent No.: US 6,979,927 B2
(45) Date of Patent: Dec. 27, 2005

(54) AUTOMOTIVE ALTERNATING-CURRENT DYNAMOELECTRIC MACHINE

(75) Inventors: Haruyuki Kometani, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/441,029

(22) Filed: May 20, 2003

(65) Prior Publication Data

US 2004/0012292 A1   Jan. 22, 2004

(30) Foreign Application Priority Data

May 23, 2002   (JP) ........................ 2002-148949

(51) Int. Cl.⁷ ............................. H02K 1/16; H02K 3/28
(52) U.S. Cl. ...................... 310/193; 310/184; 310/198
(58) Field of Search ................................ 310/193, 184, 310/179, 180, 195, 198, 201, 208, 254

(56) References Cited

U.S. PATENT DOCUMENTS

| | | | |
|---|---|---|---|
| 5,266,836 A | * | 11/1993 | Sousa ............................ 290/31 |
| 6,166,471 A | * | 12/2000 | Kometani et al. ........... 310/198 |
| 6,288,471 B1 | * | 9/2001 | Kometani et al. ........... 310/254 |
| 6,424,073 B1 | * | 7/2002 | Kometani et al. ........... 310/263 |
| 6,433,456 B1 | * | 8/2002 | Higashino et al. ........... 310/263 |
| 6,504,283 B1 | * | 1/2003 | Asao et al. .................. 310/254 |
| 6,555,992 B2 | * | 4/2003 | Asao et al. .................... 322/28 |
| 6,661,146 B2 | * | 12/2003 | Oohashi et al. ............. 310/180 |

FOREIGN PATENT DOCUMENTS

| | | | |
|---|---|---|---|
| EP | 0 881 752 A1 | 12/1998 | ............ H02K/3/28 |
| EP | 1 024 579 A2 | 8/2000 | |
| EP | 1 109 291 A2 | 6/2001 | |
| JP | 05-122898 | 5/1993 | |
| JP | 2001-169490 A | 6/2001 | .......... H02K/19/22 |
| JP | 2001-197713 | 7/2001 | |
| JP | 3242635 B2 | 10/2001 | ............ H02K/3/28 |

* cited by examiner

*Primary Examiner*—Burton Mullins
(74) *Attorney, Agent, or Firm*—Sughrue Mion, PLLC

(57) ABSTRACT

Slots are formed at a nonuniform pitch at a ratio of two slots per phase per pole. An X-phase winding phase portion constituting a stator winding is constructed by connecting in series an a-phase winding phase sub-portion and a d-phase winding phase sub-portion having a phase difference corresponding to an electrical angle of 34 degrees, a Y-phase winding phase portion is constructed by connecting in series a b-phase winding phase sub-portion and an e-phase winding phase sub-portion having a phase difference corresponding to an electrical angle of 34 degrees, and a Z-phase winding phase portion is constructed by connecting in series a c-phase winding phase sub-portion and an f-phase winding phase sub-portion having a phase difference corresponding to an electrical angle of 34 degrees.

6 Claims, 14 Drawing Sheets

FIG. 12
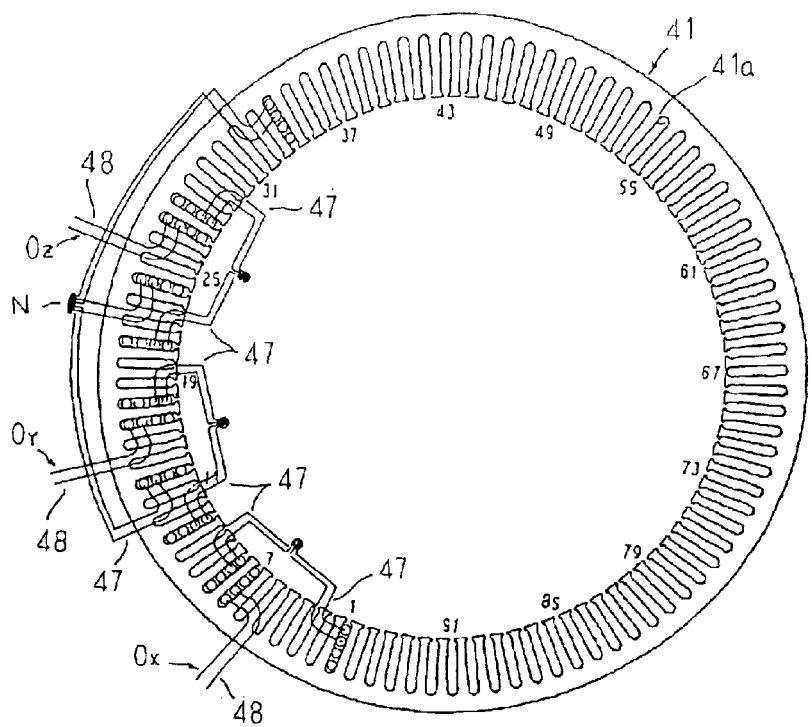
FIG. 13
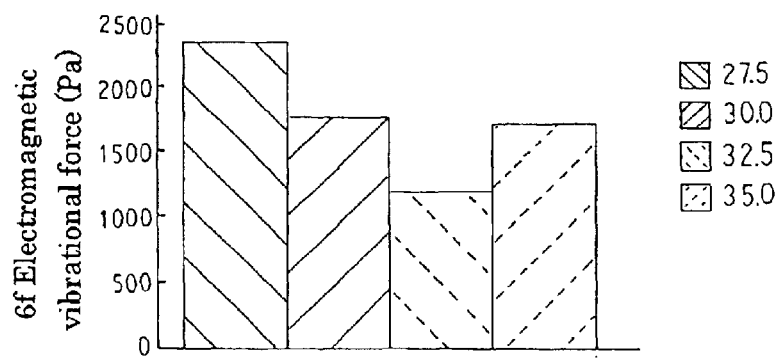
FIG. 14
| Nonuniform pitch angle α (degrees) | 27.5 | 30.0 | 32.5 | 35.0 |
|---|---|---|---|---|
| 6f Electromagnetic vibrational force (Pa) | 2331.7 | 1768.5 | 1197.8 | 1700.2 |
| Ratio relative to 30° | 1.32 | 1.0 | 0.67 | 0.96 |

Rotational speed of dynamoelectric machine (rpm)

US 6,979,927 B2

AUTOMOTIVE ALTERNATING-CURRENT DYNAMOELECTRIC MACHINE

BACKGROUND OF THE INVENTION

1. Field of the Invention

The present invention relates to an automotive alternating-current dynamoelectric machine to which is mounted a stator provided with: a stator core in which slots are formed at a nonuniform pitch at a ratio of two slots per phase per pole; and a three-phase stator winding in which winding phase portions are each formed by zigzag-connecting first and second stator winding phase sub-portions installed in adjacent slot groups.

2. Description of the Related Art

In recent years, improvements in power output are being demanded of automotive alternating-current dynamoelectric machines due to increases in automotive vehicle loads while on the other hand, automotive vehicle engine compartments are becoming increasingly smaller, leaving little mounting space to spare.

In Japanese Patent Laid-Open No. 2002-169490 (Gazette), an automotive alternating-current dynamoelectric machine is disclosed which achieves compactness and high output by forming a stator winding using a plurality of conductor segments, forming twice the usual number of slots in a stator core, and connecting together conductor segments from different layers of different slots to achieve reductions in resistance in the stator winding by increasing space factor and improving cooling.

In this conventional automotive alternating-current dynamoelectric machine, slots are formed in a stator core at a uniform angular pitch (an electrical angle of 30 degrees) at a ratio of two slots per phase per pole. Specifically, the slots constitute six slot groups having different electrical angular phases. If the number of magnetic poles in the rotor is sixteen, there are ninety-six slots.

Slot Numbers 4, 10, 16, etc., through 88, and 94 form a first slot group, and Slot Numbers 5, 11, 17, etc., through 89, and 95 form a second slot group. Slot Numbers 6, 12, 18, etc., through 90, and 96 form a third slot group, and Slot Numbers 1, 7, 13, etc., through 85, and 91 form a fourth slot group. Slot Numbers 2, 8, 14, etc., through 86, and 92 form a fifth slot group, and Slot Numbers 3, 9, 15, etc., through 87, and 93 form a sixth slot group.

The first slot group and the second slot group accommodate an X-phase winding phase portion. The third slot group and the fourth slot group accommodate a Y-phase winding phase portion. The fifth slot group and the sixth slot group accommodate a Z-phase winding phase portion.

A stator winding 110 is constructed by Y-connecting the X-phase winding phase portion $110_X$, the Y-phase winding phase portion $110_Y$, and the Z-phase winding phase portion $110_Z$, as shown in FIG. 23.

In the stator core, pairs of U-shaped conductor segments are accommodated in pairs of slots six slots apart (corresponding to a pitch of one magnetic pole). Twelve wave windings each functioning as a unit winding making one round of the stator core are constructed by connecting in series the conductor segments accommodated in the pairs of slots six slots apart. In other words, two wave windings are accommodated in each of the slot groups.

Now, two wave windings 100a and 101a are accommodated in the first slot group, and two wave windings 100b and 101b are accommodated in the second slot group. The wave winding 100a accommodated in the first slot group and the wave winding 100b accommodated in the second slot group are connected in series to constitute a partial winding 100, and the wave winding 101a accommodated in the first slot group and the wave winding 101b accommodated in the second slot group are connected in series to constitute a second partial winding 101. Finally, the X-phase winding phase portion $110_X$ is constructed by connecting the partial windings 100 and 101 in parallel.

Moreover, the Y-phase winding phase portion $110_Y$ and the Z-phase winding phase portion $110_Z$ are also constructed in a similar manner to the X-phase winding phase portion $110_X$.

Automotive alternating-current dynamoelectric machines of this kind are operated over a comparatively wide range of rotational speeds from low speeds to high speeds. Higher harmonic electromagnetic noise in a normal service region from an idling state in which engine rotational speeds are low has a particularly different frequency from the noise of the engine and auxiliary machinery and is heard as a noise that is unpleasant to human ears.

Because the conventional automotive alternating-current dynamoelectric machine is constructed such that the slots are formed at a ratio of two slots per phase per pole at a uniform angular pitch corresponding to an electrical angle of 30 degrees, and the winding phase portions of the stator winding are constructed by connecting in series wave windings having a phase difference corresponding to an electrical angle of 30 degrees, a large 6f electromagnetic vibrational force arises during operation. Thus, one problem has been that electromagnetic noise due to the harmonic components of this 6f electromagnetic vibrational force is large, subjecting passengers to unpleasant sensations.

This conventional automotive alternating-current dynamoelectric machine can also be used in applications where the automotive alternating-current dynamoelectric machine is linked to a shaft of an engine by means of a belt and controlled by an inverter to generate starting torque in the engine. In such cases, another problem has been that vibrations due to the 6f electromagnetic vibrational force are transmitted to the belt, reducing the service life of the belt. During inverter mode at low rotational speeds, where electric power supply is controlled by an inverter unit, since the harmonic components of the 6f electromagnetic vibrational force correspond to the resonance points of the stator, another problem has been that deterioration of the belt service life is particularly promoted.

SUMMARY OF THE INVENTION

The present invention aims to solve the above problems and an object of the present invention is to provide an automotive alternating-current dynamoelectric machine having reduced electromagnetic noise and reduced vibration by installing winding phase sub-portions in a stator core in which slots are formed at a nonuniform pitch at a ratio of two slots per phase per pole such that each winding phase sub-portion is accommodated in a slot group constituted by slots separated by a number of slots corresponding to a pitch of one magnetic pole and constructing winding phase portions of a stator winding by connecting together winding phase sub-portions accommodated in adjacent pairs of the slot groups to reduce generated 6f electromagnetic vibrational force.

With the above object in view, an automotive alternating-current dynamoelectric machine of the present invention includes a stator having an annular stator core and a three-phase stator winding mounted to the stator core, and a rotor rotatably disposed inside the stator for generating a magnetic flux. Slots are disposed at a ratio of two slots per phase per pole in the stator core. Further, an X-phase winding phase portion, a Y-phase winding phase portion, and a Z-phase winding phase portion constituting the three-phase stator winding are each constructed by connecting in series first and second stator winding phase sub-portions installed in an adjacent pair of slot groups. The slots are formed at a nonuniform pitch in which an angle between center lines of slot opening portions alternates between an electrical angle of a and an electrical angle of $(60°-\alpha)$, where a does not equal 30 degrees ($\alpha \neq 30°$).

Therefore, spatial fifth-order harmonics and spatial seventh-order harmonics in the stator can be reduced, thereby providing an automotive alternating-current dynamoelectric machine enabling 6f electromagnetic vibrational force, which is a factor in the generation of unpleasant noise and vibration, to be reduced.

BRIEF DESCRIPTION OF THE DRAWINGS

FIG. 12 is a rear end elevation explaining connections in the stator winding in the stator of the automotive alternating-current dynamoelectric machine according to Embodiment 2 of the present invention;

FIG. 13 is a graph showing a relationship between 6f electromagnetic vibrational force and nonuniform pitch angle in the automotive alternating-current dynamoelectric machine according to Embodiment 2 of the present invention;

FIG. 14 is a table showing a relationship between 6f electromagnetic vibrational force and nonuniform pitch angle in the automotive alternating-current dynamoelectric machine according to Embodiment 2 of the present invention;

DETAILED DESCRIPTION OF THE PREFERRED EMBODIMENTS

Preferred embodiments of the present invention will now be explained with reference to the drawings.

Embodiment 1

Figure 1:
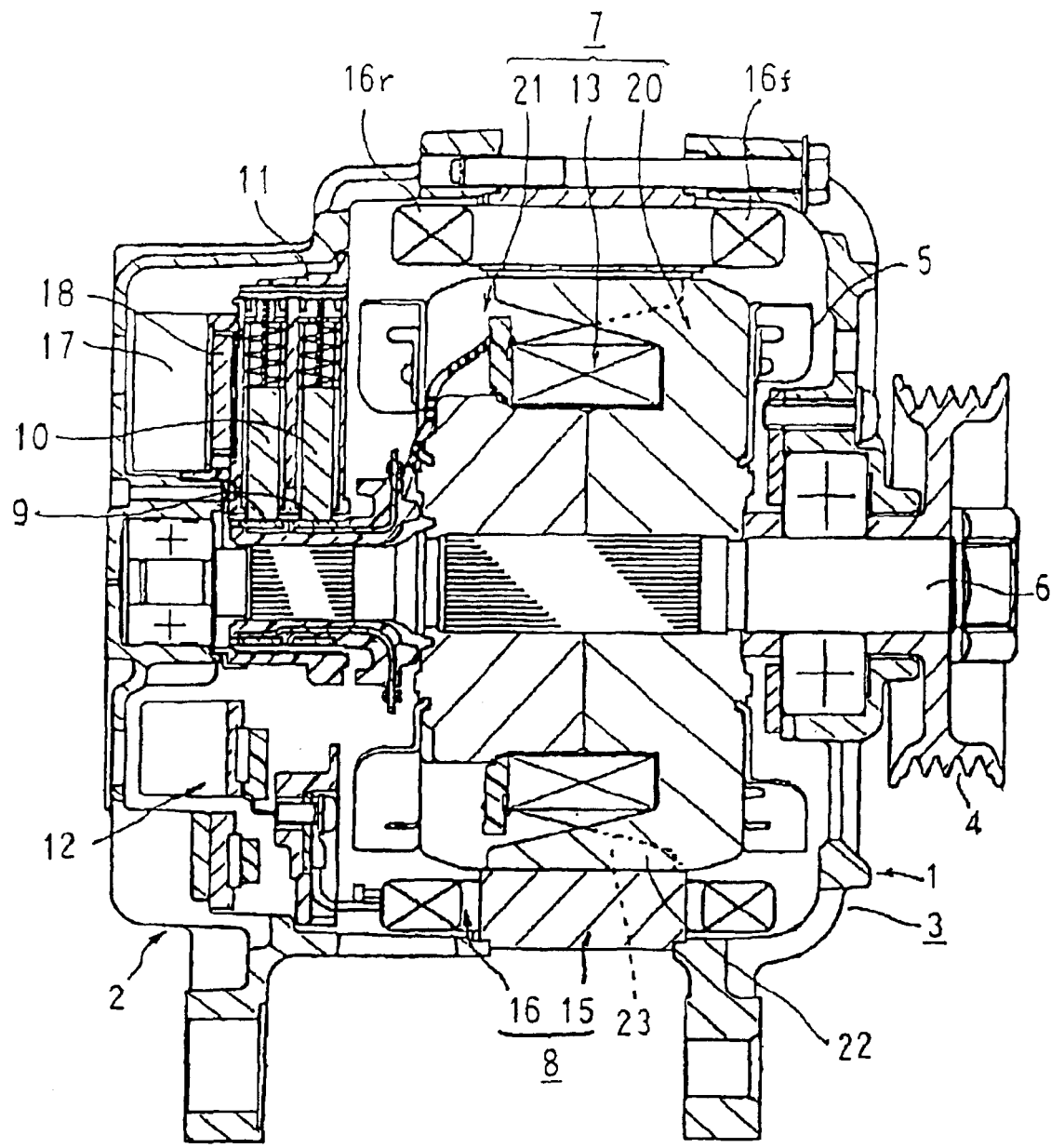
FIG. 1 is a longitudinal section showing an automotive alternating-current dynamoelectric machine according to Embodiment 1 of the present invention.
Figure 2:
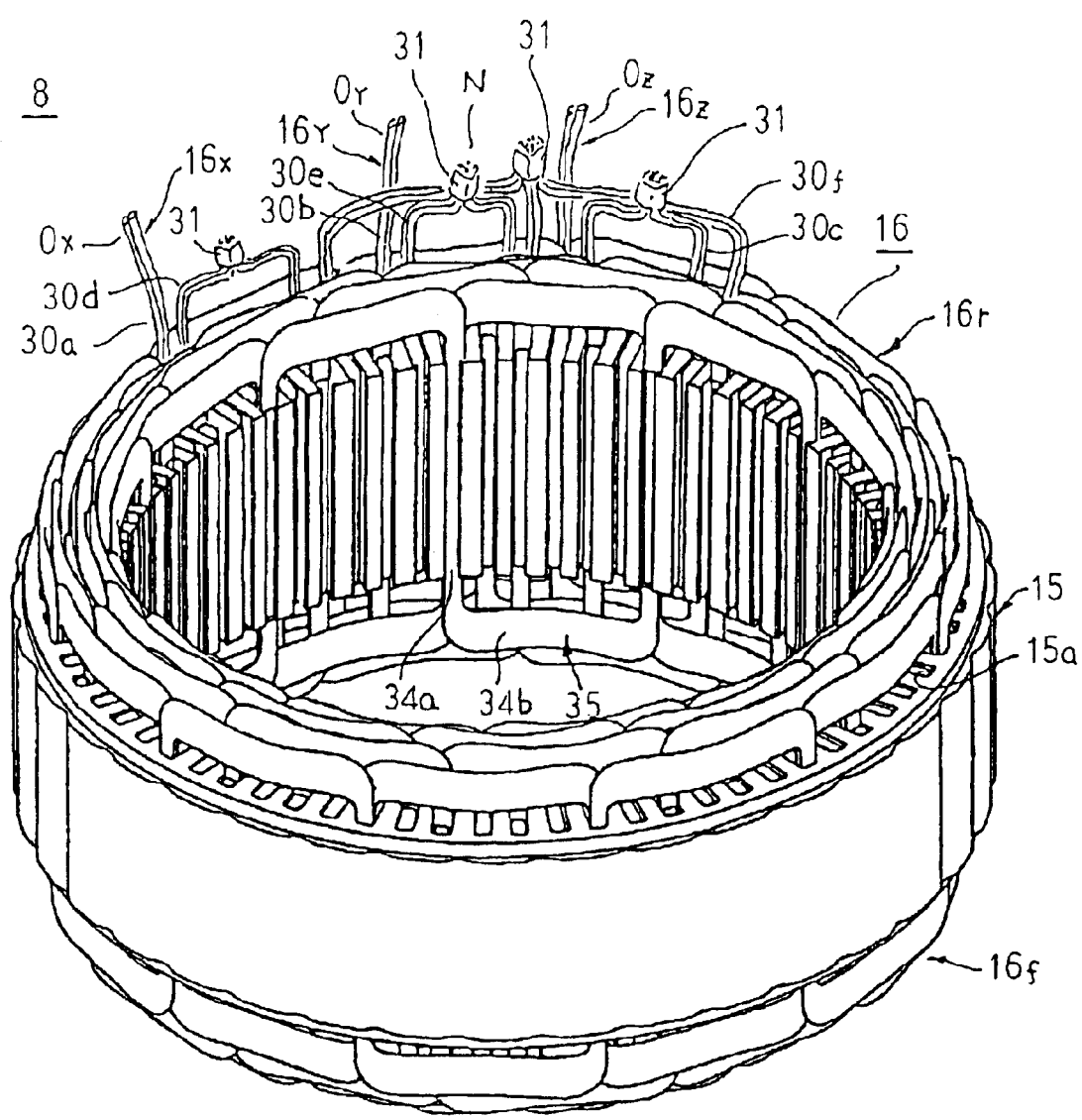
FIG. 2 is a perspective showing a stator used in the automotive alternating-current dynamoelectric machine according to Embodiment 1 of the present invention.
Figure 3:
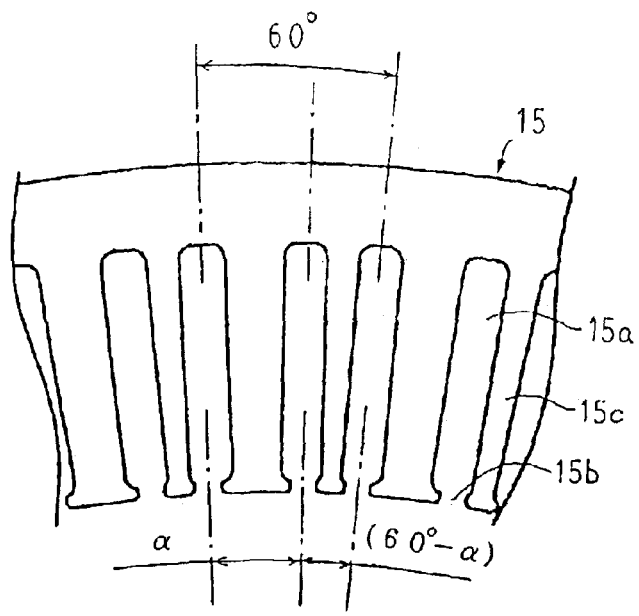
FIG. 3 is an end elevation showing part of a stator core used in the automotive alternating-current dynamoelectric machine according to Embodiment 1 of the present invention.
Figure 4:
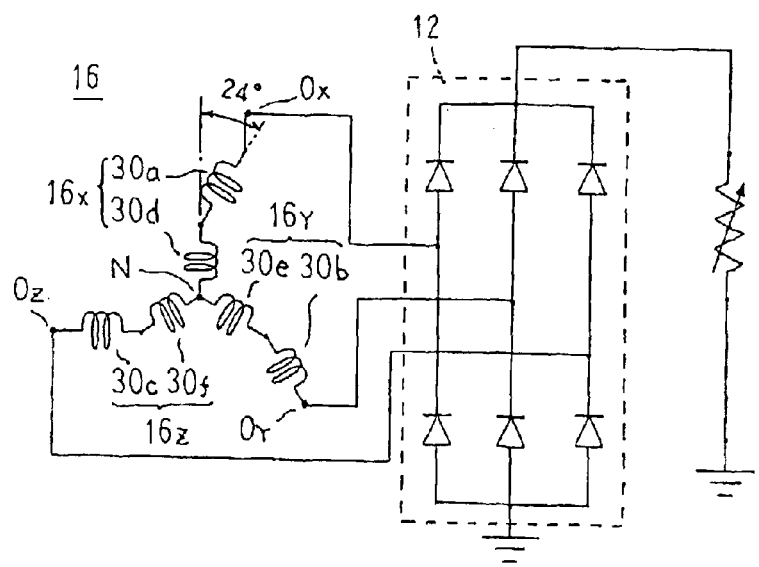
FIG. 4 is a circuit diagram showing an electrical circuit in the automotive alternating-current dynamoelectric machine according to Embodiment 1 of the present invention.

FIG. 1 is a longitudinal section showing an automotive alternating-current dynamoelectric machine according to Embodiment 1 of the present invention, FIG. 2 is a perspective showing a stator used in the automotive alternating-current dynamoelectric machine according to Embodiment 1 of the present invention, FIG. 3 is an end elevation showing part of a stator core used in the automotive alternating-current dynamoelectric machine according to Embodiment 1 of the present invention, and FIG. 4 is a circuit diagram showing an electrical circuit in the automotive alternating-current dynamoelectric machine according to Embodiment 1 of the present invention.

In FIG. 1, an automotive alternating-current dynamoelectric machine is provided with: a case 3 constituted by a front bracket 1 and a rear bracket 2 made of aluminum; a shaft 6 disposed inside the case 3; a pulley 4 secured to a first end portion of the shaft 6; a Lundell-type rotor 7 secured to the shaft 6; fans 5 secured to first and second axial end portions of the rotor 7; a stator 8 secured to the case 3 so as to envelop the rotor 7; slip rings 9 secured to a second end portion of the shaft 6 for supplying electric current to the rotor 7; a pair of brushes 10 sliding on surfaces of the slip rings 9; a brush holder 11 for accommodating the brushes 10; a rectifier 12 electrically connected to the stator 8 for converting an alternating current generated in the stator 8 into a direct current; and a regulator 18 mounted to a heat sink 17 fitted onto the brush holder 11, the regulator 18 adjusting the magnitude of the alternating voltage generated in the stator 8.

The rotor 7 includes: a field winding 13 for generating magnetic flux on passage of an electric current; and a pair of first and second pole cores 20 and 21 disposed so as to cover the field winding 13, magnetic poles being formed in the first and second pole cores 20 and 21 by a magnetic flux from the field winding. The first and second pole cores 20 and 21 are made of iron, each has six first and second claw-shaped magnetic poles 22 and 23 each having a generally trapezoidal outermost diameter surface shape disposed on an outer circumferential edge portion at a uniform angular pitch in a circumferential direction so as to project axially, and the first and second pole cores 20 and 21 are fixed to the shaft 6 facing each other such that the first and second claw-shaped magnetic poles 22 and 23 intermesh. In other words, the number of magnetic poles in this rotor 7 is twelve.

The stator 8 is held between the front bracket 1 and the rear bracket 2 such that a uniform air gap is formed between outer circumferential surfaces of the claw-shaped magnetic poles 22 and 23 and an inner circumferential surface of a stator core 15.

Next, a specific configuration of the stator 8 will be explained with reference to FIGS. 2 to 5.

The stator 8 is constituted by: a cylindrical stator core 15 composed of a laminated body of magnetic plates; and a stator winding 16 installed in the stator core 15.

Seventy-two slots 15a opening onto an inner circumferential side are formed in the stator core 15 in a circumferential direction. In other words, the slots 15a are formed at a ratio of two slots per phase per pole. The slots 15a, as shown in FIG. 3, are formed at a nonuniform pitch by varying the circumferential width of teeth 15c such that distances between center lines of slot opening portions 15b alternate between an electrical angle of $\alpha$ and an electrical angle of $(60°-\alpha)$. Here, a equals 34 degrees ($\alpha=34°$). Moreover, the center lines are straight lines each joining a circumferential center of a slot opening portion 15b and the central axis of the stator core 15 in a plane perpendicular to the central axis of the stator core 15.

Next, a construction of the stator winding 16 will be explained.

Figure 5A:
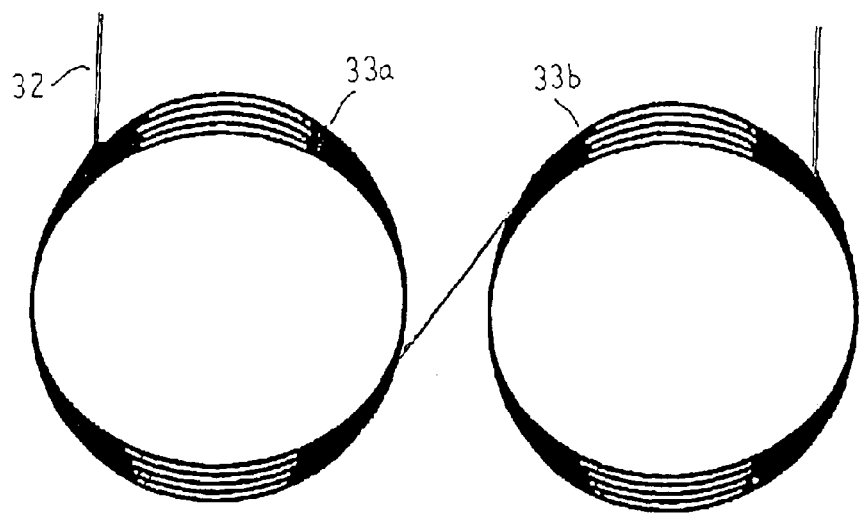
FIG. 5A is a diagram explaining a method for manufacturing a star-shaped winding unit constituting a stator winding used in the automotive alternating-current dynamoelectric machine according to Embodiment 1 of the present invention.
Figure 5B:
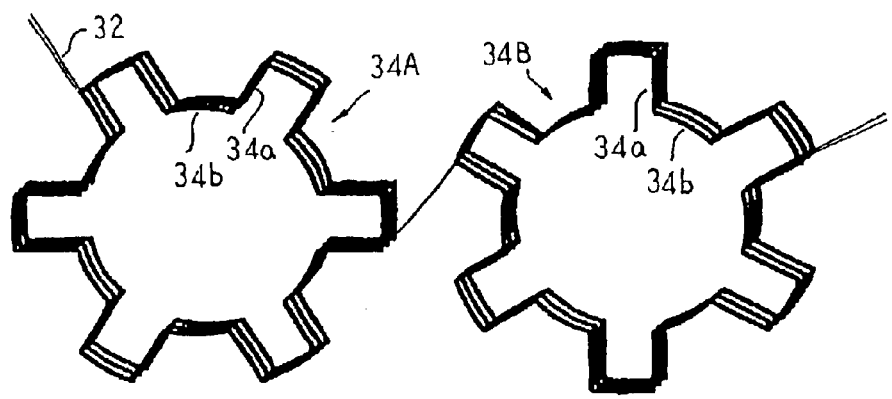
FIG. 5B is another diagram explaining the method for manufacturing the star-shaped winding unit constituting the stator winding used in the automotive alternating-current dynamoelectric machine according to Embodiment 1 of the present invention.
Figure 5C:
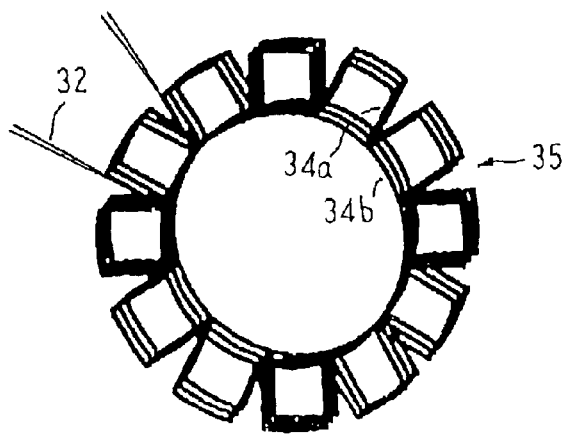
FIG. 5C is yet another diagram explaining the method for manufacturing the star-shaped winding unit constituting the stator winding used in the automotive alternating-current dynamoelectric machine according to Embodiment 1 of the present invention.

First, as shown in FIG. 5A, a first annular winding unit 33a is prepared by winding two conductor wires 32 each composed of a continuous copper wire having a circular cross section coated with an electrical insulator for a predetermined number of winds, and a second annular winding unit 33b is prepared by continuing to wind the two conductor wires 32 for a predetermined number of winds. Next, as shown in FIG. 5B, first and second intermediate star-shaped winding units 34A and 34B each composed of two conductor wires 32 are prepared by forming each of the first and second annular winding units 33a and 33b into a star shape in which adjacent pairs of slot-accommodated portions 34a are alternately joined on an inner circumferential side and an outer circumferential side by coil end portions 34b. Next, the first and second intermediate star-shaped winding units 34A and 34B are folded over at a linking portion of the conductor wires 32, and as shown in FIG. 5C, a star-shaped winding unit 35 is prepared by stacking the first and second intermediate star-shaped winding units 34A and 34B on top of one another such that the slot-accommodated portions 34a are superposed and the coil end portions 34b face each other in a radial direction.

A first star-shaped winding unit 35 prepared in this manner is mounted to the stator core 15 such that each of the slot-accommodated portions 34a is accommodated in Slot Numbers 1, 7, etc., through 67 of the slots 15a and such that winding ends thereof project outward from Slot Numbers 1 and 7 of the slots 15a, constituting an a-phase winding phase sub-portion 30a. A second star-shaped winding unit 35 is mounted to the stator core 15 such that each of the slot-accommodated portions 34a is accommodated in Slot Numbers 2, 8, etc., through 68 of the slots 15a and such that winding ends thereof project outward from Slot Numbers 2 and 8 of the slots 15a, constituting a d-phase winding phase sub-portion 30d. A third star-shaped winding unit 35 is mounted to the stator core 15 such that each of the slot-accommodated portions 34a is accommodated in Slot Numbers 3, 9, etc., through 69 of the slots 15a and such that winding ends thereof project outward from Slot Numbers 21 and 27 of the slots 15a, constituting a c-phase winding phase sub-portion 30c. A fourth star-shaped winding unit 35 is mounted to the stator core 15 such that each of the slot-accommodated portions 34a is accommodated in Slot Numbers 4, 10, etc., through 70 of the slots 15a and such that winding ends thereof project outward from Slot Numbers 22 and 28 of the slots 15a, constituting an f-phase winding phase sub-portion 30f. A fifth star-shaped winding unit 35 is mounted to the stator core 15 such that each of the slot-accommodated portions 34a is accommodated in Slot Numbers 5, 11, etc., through 71 of the slots 15a and such that winding ends thereof project outward from Slot Numbers 11 and 17 of the slots 15a, constituting a b-phase winding phase sub-portion 30b. And a sixth star-shaped winding unit 35 is mounted to the stator core 15 such that each of the slot-accommodated portions 34a is accommodated in Slot Numbers 6, 12, etc., through 72 of the slots 15a and such that winding ends thereof project outward from Slot Numbers 12 and 18 of the slots 15a, constituting an e-phase winding phase sub-portion 30e.

The winding end of the a-phase winding phase sub-portion 30a projecting outward from Slot Number 7 of the slots 15a and the winding end of the d-phase winding phase sub-portion 30d projecting outward from Slot Number 2 of the slots 15a are led around an upper portion of the coil end portions 34b (axially outside the stator core 15), gathered together, integrated by a crimp 31, and joined by soldering. Thus, an X-phase winding phase portion $16_X$ is formed, in which the a-phase winding phase sub-portion 30a and the d-phase winding phase sub-portion 30d are connected in series. In other words, the a-phase winding phase sub-portion 30a and the d-phase winding phase sub-portion 30d, respectively functioning as first and second stator winding phase sub-portions, are zigzag-connected at an electrical angle of 34 degrees.

The winding end of the b-phase winding phase sub-portion 30b projecting outward from Slot Number 17 of the slots 15a and the winding end of the e-phase winding phase sub-portion 30e projecting outward from Slot Number 12 of the slots 15a are similarly led around an upper portion of the coil end portions 34b, gathered together, integrated by a crimp 31, and joined by soldering. Thus, a Y-phase winding phase portion $16_Y$ is formed, in which the b-phase winding phase sub-portion 30b and the e-phase winding phase sub-portion 30e are connected in series. In other words, the b-phase winding phase sub-portion 30b and the e-phase winding phase sub-portion 30e, functioning as first and second stator winding phase sub-portions, are zigzag-connected at an electrical angle of 34 degrees.

The winding end of the c-phase winding phase sub-portion 30c projecting outward from Slot Number 27 of the slots 15a and the winding end of the f-phase winding phase sub-portion 30f projecting outward from Slot Number 22 of the slots 15a are similarly led around an upper portion of the coil end portions 34b, gathered together, integrated by a crimp 31, and joined by soldering. Thus, a Z-phase winding phase portion $16^Z$ is formed, in which the c-phase winding phase sub-portion 30c and the f-phase winding phase sub-portion 30f are connected in series. In other words, the c-phase winding phase sub-portion 30c and the f-phase winding phase sub-portion 30f, functioning as first and second stator winding phase sub-portions, are zigzag-connected at an electrical angle of 34 degrees.

The winding end of the d-phase winding phase sub-portion 30d projecting outward from Slot Number 8 of the slots 15a, the winding end of the e-phase winding phase sub-portion 30e projecting outward from Slot Number 18 of the slots 15a, and the winding end of the f-phase winding phase sub-portion 30f projecting outward from Slot Number 28 of the slots 15a are similarly led around an upper portion of the coil end portions 34b, gathered together, integrated by a crimp 31, and joined by soldering to constitute a neutral point N. Thus, a stator winding 16 (a three-phase alternating-current winding) is formed in which the X-phase winding phase portion $16^X$, the Y-phase winding phase portion $16_Y$, and the Z-phase winding phase portion $16_Z$ are Y-connected.

Here, the remaining winding ends of the a-phase winding phase sub-portion 30a, the b-phase winding phase sub-portion 30b, and the c-phase winding phase sub-portion 30c constitute output wires $O_X$, $O_Y$, and $O_Z$ of the X-phase winding phase portion $16_X$, the Y-phase winding phase portion $16_Y$, and Z-phase winding phase portion $16_Z$, respectively. The coil end portions 34b of each of the winding phase sub-portions 30a, 30b, 30c, 30d, 30e, and 30f constitute front-end and rear-end coil ends 16f and 16r of the stator winding 16.

Moreover, because two conductor wires 32 are installed together, the a-phase winding phase sub-portion 30a is constructed such that winding phase sub-portions having the same number of turns are connected in parallel. The a-phase winding phase sub-portion 30a is installed such that bundles of the conductor wires 32 projecting outward from any given slot 15a are distributed half each in first and second circumferential directions. The rest of the winding phase sub-portions 30b, 30c, 30d, 30e, and 30f are constructed in a similar manner.

The a-phase, b-phase, and c-phase winding phase sub-portions 30a, 30b, and 30c are each given a phase difference corresponding to an electrical angle of 120 degrees, and the d-phase, e-phase, and f-phase winding phase sub-portions 30d, 30e, and 30f are each given a phase difference corresponding to an electrical angle of 120 degrees.

The output wires $O_X$, $O_Y$, and $O_Z$ in the stator 8 constructed in this manner are connected to the rectifier 12 to constitute the circuit shown in FIG. 4.

Next, the action and effects of Embodiment 1 will be explained.

The electromagnetic noise and vibrations which cause problems in conventional automotive alternating-current dynamoelectric machines result from 6f electromagnetic vibrational force (where f is the fundamental frequency). The cause thereof is known to be spatial zero-order, temporal ±sixth-order electromagnetic vibrational force. Here, the minus sign ("−") or "negative" on the temporal harmonic order means a direction opposite to the direction of rotation of the fundamental rotating magnetic field, in other words, a negative phase where the direction of the-fundamental rotating magnetic field is a positive phase.

Now, when divided into air gap magnetic flux density harmonics, the electromagnetic vibrational force can be considered to be mainly generated by the following harmonic interactions:

(a) interaction between a spatial fifth-order temporal negative first-order harmonic and a spatial fifth-order temporal fifth-order harmonic;

(b) interaction between a spatial seventh-order temporal first-order harmonic and a spatial seventh-order temporal seventh-order harmonic;

(c) interaction between a spatial third-order temporal third-order harmonic and a spatial third-order temporal negative third-order harmonic; and (d) interaction between a spatial first-order temporal first-order harmonic and a spatial first-order temporal negative fifth-order harmonic.

Here, the spatial fifth-order temporal negative first-order harmonic and the spatial seventh-order temporal first-order harmonic are stator magnetomotive force harmonics and stator slot harmonics. The spatial fifth-order temporal fifth-order harmonic and the spatial seventh-order temporal seventh-order harmonic are rotor magnetomotive force harmonics. If the rotor has a claw pole shape, since the phase of the spatial fifth-order temporal fifth-order harmonic reverses in the axial direction every (360/5) degrees and the phase of the spatial seventh-order temporal seventh-order harmonic reverses every (360/7) degrees, these rotor magnetomotive force harmonics do not generally become large. Consequently, electromagnetic vibrational forces arising due to (a) and (b) do not become large.

On the other hand, the phase of the spatial third-order temporal third-order harmonic reverses every (360/3) degrees, but in most cases, the claw pole pitch does not last until this 120-degree phase reverses. Consequently, this spatial third-order temporal third-order harmonic is very large compared to others. The spatial first-order temporal first-order harmonic, being the fundamental wave, is naturally large. From this, it can be inferred that the magnitude of the spatial third-order temporal negative third-order harmonic and the spatial first-order temporal negative fifth-order harmonic affect the magnitude of the 6f electromagnetic vibrational force.

When the spatial third-order temporal negative third-order harmonic is considered in view of the above, it can be seen that the interaction between the stator spatial fifth-order temporal negative first-order harmonic and the rotor slot harmonics (permeance harmonics) is dominant in this harmonic. In other words, it can be seen that the 6f electromagnetic vibrational force can be reduced by reducing the stator spatial fifth-order temporal negative first-order harmonic.

Similarly, when the spatial first-order temporal negative fifth-order harmonic is considered, the interaction between the stator spatial fifth-order temporal negative first-order harmonic and the double harmonics of the rotor slot harmonics can be considered to be dominant in this harmonic. Consequently, it can be seen that the 6f electromagnetic vibrational force can also be reduced in that case by reducing the stator spatial fifth-order temporal negative first-order harmonic.

Figure 6:
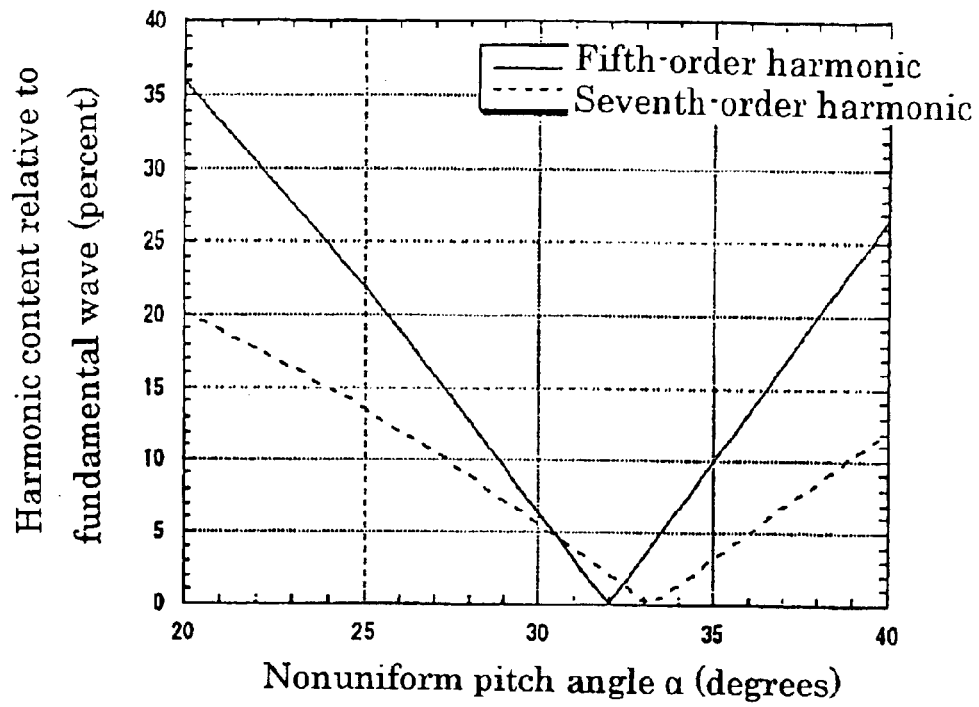
FIG. 6 is a graph showing percentage content of a spatial fifth-order temporal negative first-order harmonic and a spatial seventh-order temporal first-order harmonic in a stator relative to a fundamental wave in the automotive alternating-current dynamoelectric machine according to Embodiment 1 of the present invention.
Figure 7:
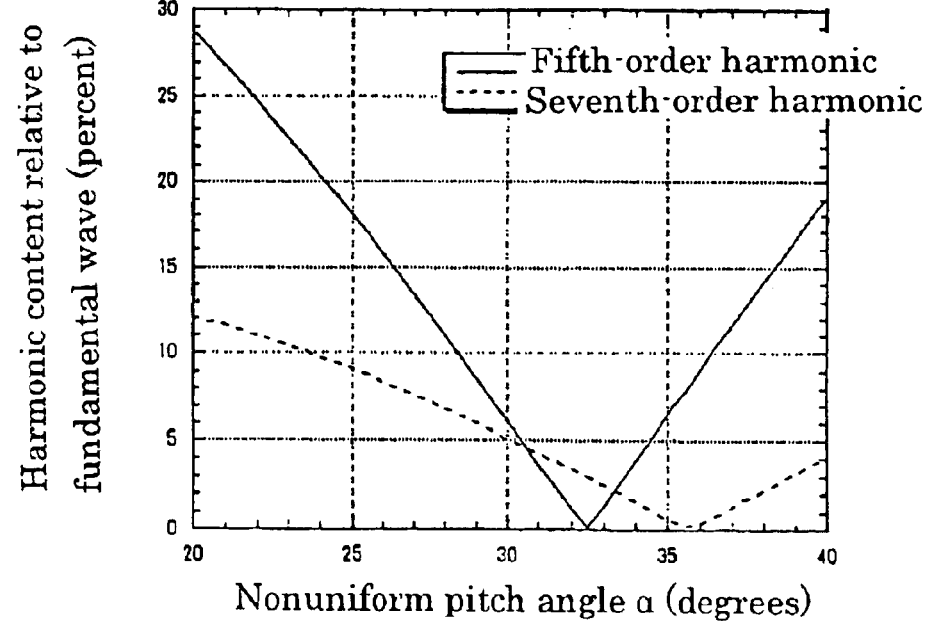
FIG. 7 is a graph showing percentage content of a spatial fifth-order temporal negative first-order harmonic and a spatial seventh-order temporal first-order harmonic in another stator relative to the fundamental wave in the automotive alternating-current dynamoelectric machine according to Embodiment 1 of the present invention.

Now, percentage content of the stator spatial fifth-order temporal negative first-order harmonic and spatial seventh-order temporal first-order harmonic relative to the fundamental wave when the nonuniform pitch angle a of the stator 8 is varied is shown in FIGS. 6 and 7. In FIGS. 6 and 7, the horizontal axis represents the nonuniform pitch angle a (in degrees). FIG. 6 is a case using a stator core in which the ratio of tooth tip end width to slot opening portion width is 2:1, and FIG. 7 is a case using a stator core in which the ratio of tooth tip end width to slot opening portion width is 3:1. Moreover, stator cores are generally manufactured such that the ratio of tooth tip end width to slot opening portion width is in a range from equal to or greater than 2 to equal to or less than 3 ($2 \leq$ (tooth tip end width/slot opening portion width)$\leq 3$).

It can be seen from FIG. 6 that the percentage content of the stator spatial fifth-order temporal negative first-order harmonic relative to the fundamental wave is at a minimum value when $\alpha$ is approximately equal to 32 degrees ($\alpha \approx 32°$), and the percentage content of the stator spatial seventh-order temporal first-order harmonic relative to the fundamental wave is at a minimum value when $\alpha$ is approximately equal to 33 degrees ($\alpha \approx 33°$). The percentage content of the stator spatial fifth-order temporal negative first-order harmonic is lower when $\alpha$ is greater than 30 degrees and less than 34 degrees ($30° < \alpha < 34°$) than the percentage content of the spatial fifth-order temporal negative first-order harmonic in a stator with a uniform angular pitch ($\alpha = 30°$). The percentage content of the stator spatial seventh-order temporal first-order harmonic is lower when $\alpha$ is greater than 30 degrees and less than 36.5 degrees ($30° < \alpha < 36.5°$) than the percentage content of the spatial seventh-order temporal first-order harmonic in a stator with a uniform angular pitch ($\alpha = 30°$).

The percentage content of the stator spatial fifth-order temporal negative first-order harmonic when $\alpha$ equals 34 degrees ($\alpha = 34°$) is equivalent to the percentage content of the stator spatial fifth-order temporal negative first-order harmonic when $\alpha$ equals 30 degrees ($a = 30°$), but because the percentage content of the stator spatial seventh-order temporal first-order harmonic when $\alpha$ equals 34 degrees ($\alpha = 34°$) is significantly lower than the percentage content of the stator spatial seventh-order temporal first-order harmonic when $\alpha$ equals 30 degrees ($\alpha = 30°$), the 6f electromagnetic vibrational force when $\alpha$ equals 34 degrees ($\alpha = 34°$) can be reduced below that of the 6f electromagnetic vibrational force when $\alpha$ equals 30 degrees ($\alpha = 30°$).

Similarly, it can be seen from FIG. 7 that the percentage content of the stator spatial fifth-order temporal negative first-order harmonic relative to the fundamental wave is at a minimum value when $\alpha$ is approximately equal to 32.5 degrees ($\alpha \approx 32.5°$), and the percentage content of the stator spatial seventh-order temporal first-order harmonic relative to the fundamental wave is at a minimum value when $\alpha$ is approximately equal to 35.5 degrees ($\alpha \approx 35.5°$). The percentage content of the stator spatial fifth-order temporal negative first-order harmonic is lower when a is greater than 30 degrees and less than 35 degrees ($30° < \alpha < 35°$) than the percentage content of the spatial fifth-order temporal negative first-order harmonic in a stator with a uniform angular pitch ($\alpha = 30°$). The percentage content of the stator spatial seventh-order temporal first-order harmonic is lower when $\alpha$ is greater than 30 degrees and equal to or less than 40 degrees ($30° < \alpha \leq 40°$) than the percentage content of the spatial seventh-order temporal first-order harmonic in a stator with a uniform angular pitch ($\alpha = 30°$).

The percentage content of the stator spatial fifth-order temporal negative first-order harmonic when $\alpha$ equals 35 degrees ($\alpha = 35°$) is equivalent to the percentage content of the stator spatial fifth-order temporal negative first-order harmonic when $\alpha$ equals 30 degrees ($\alpha = 30°$), but because the percentage content of the stator spatial seventh-order temporal first-order harmonic when $\alpha$ equals 35 degrees ($\alpha = 35°$) is significantly lower than the percentage content of the stator spatial seventh-order temporal first-order harmonic when $\alpha$ equals 30 degrees ($\alpha = 30°$), the 6f electromagnetic vibrational force when $\alpha$ equals 35 degrees ($\alpha = 35°$) can be reduced below that of the 6f electromagnetic vibrational force when $\alpha$ equals 30 degrees ($\alpha = 30°$).

From this, it can be seen that in stator cores manufactured such that the ratio of tooth tip end width to slot opening portion width is in a range from equal to or greater than 2 to equal to or less than 3 ($2 \leq$ (tooth tip end width/slot opening portion width)$\leq 3$), the 6f electromagnetic vibrational force can be reliably reduced compared to when $\alpha$ equals 30 degrees ($\alpha = 30°$) by setting $\alpha$ to equal to or greater than 31 degrees and equal to or less than 34 degrees ($31° \leq \alpha \leq 34°$).

According to Embodiment 1, because a is set to 34 degrees ($34°$), the 6f electromagnetic vibrational force is reduced compared to the conventional technique, thereby providing an automotive alternating-current dynamoelectric machine having reduced electromagnetic noise and reduced vibration. Thus, in an automotive vehicle mounted with the automotive alternating-current dynamoelectric machine according to the present invention, belt service life can be lengthened without subjecting passengers to unpleasant sensations.

Furthermore, the X-phase winding phase portion 16$_X$, the Y-phase winding phase portion 16$_Y$, and the Z-phase winding phase portion 16$_Z$ are each constructed by connecting in series pairs of winding sub-portions having a phase difference corresponding to an electrical angle of 34 degrees ($34°$). Thus, because the pairs of winding phase sub-portions are connected in series between adjacent slots 15*a* having an electrical angle of 34 degrees ($34°$), connection space for connecting the pairs of winding phase sub-portions in series is widened, thereby improving connection workability.

Moreover, in Embodiment 1 above, as shown in FIG. 4, a rectifier 12 provided with three diode bridges is used, the output wires $O_X$, $O_Y$, and $O_Z$ of the stator winding 16 being connected to respective intermediate points of the diode bridges, but it is also acceptable to use a rectifier provided with four diode bridges, the output wires $O_X$, $O_Y$, and $O_Z$ of the stator winding 16 being connected the intermediate points of three of the diode bridges, and the neutral point N being connected to an intermediate point of the remaining diode bridge. In such cases, output can be efficiently extracted from the neutral point voltage of the stator winding 16 in the high-speed rotational regions of the automotive alternating-current dynamoelectric machine, enabling increased output.

Embodiment 2

Figure 8:
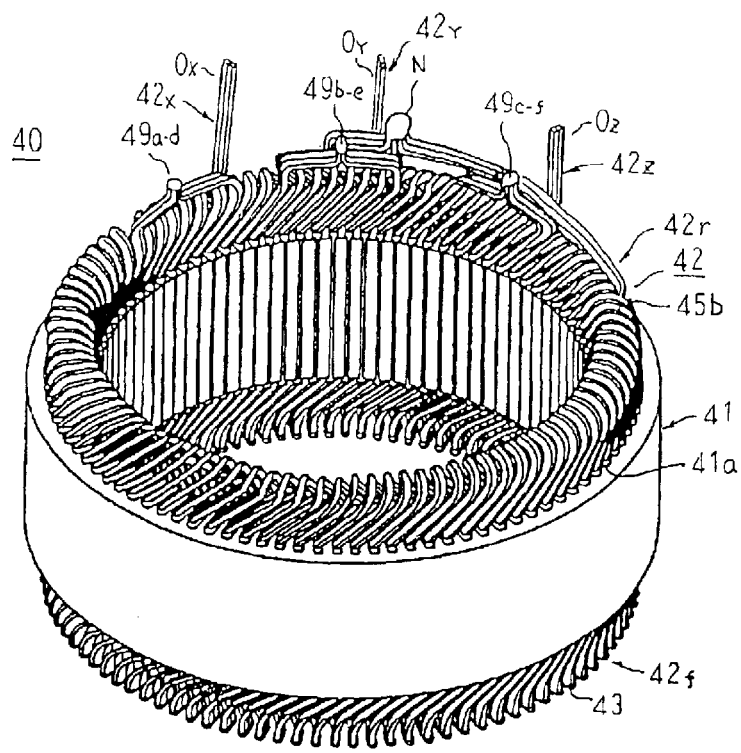
FIG. 8 is a perspective showing a stator of an automotive alternating-current dynamoelectric machine according to Embodiment 2 of the present invention.
Figure 9:
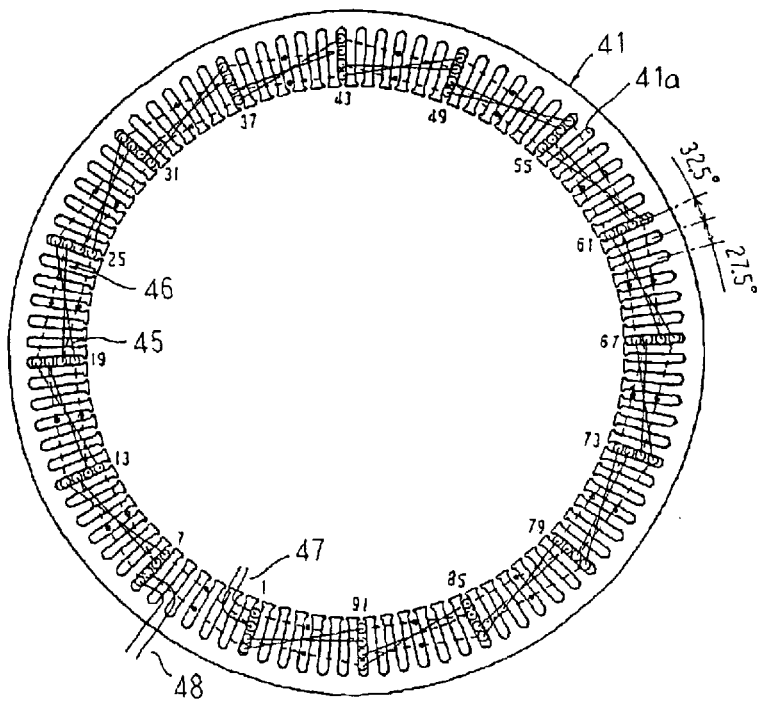
FIG. 9 is a rear end elevation explaining installation of a single winding phase sub-portion constituting a stator winding of the automotive alternating-current dynamoelectric machine according to Embodiment 2 of the present invention.
Figure 10:
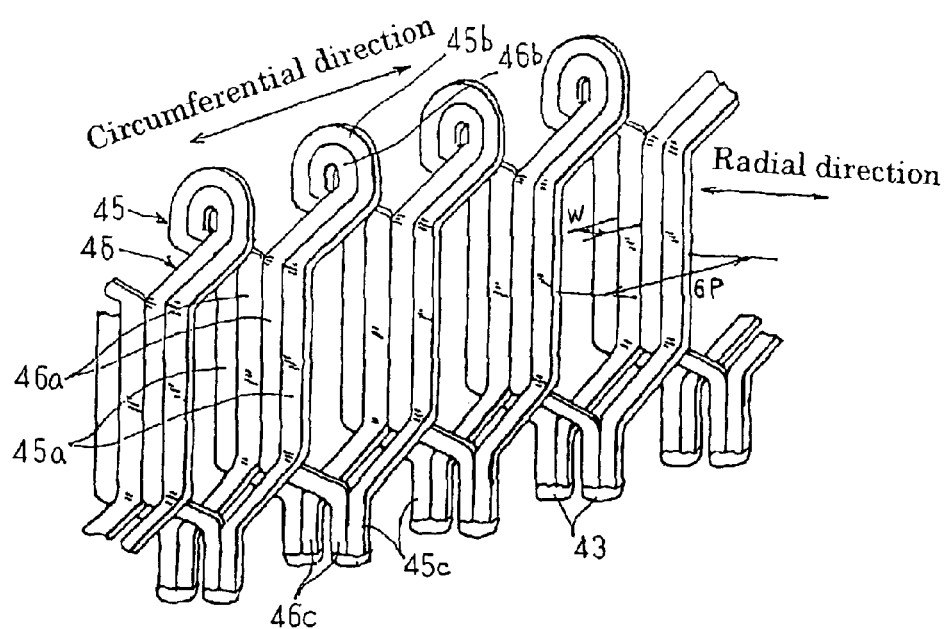
FIG. 10 is a partial perspective explaining a construction of the single winding phase sub-portion in the stator winding of the automotive alternating-current dynamoelectric machine according to Embodiment 2 of the present invention.
Figure 11:
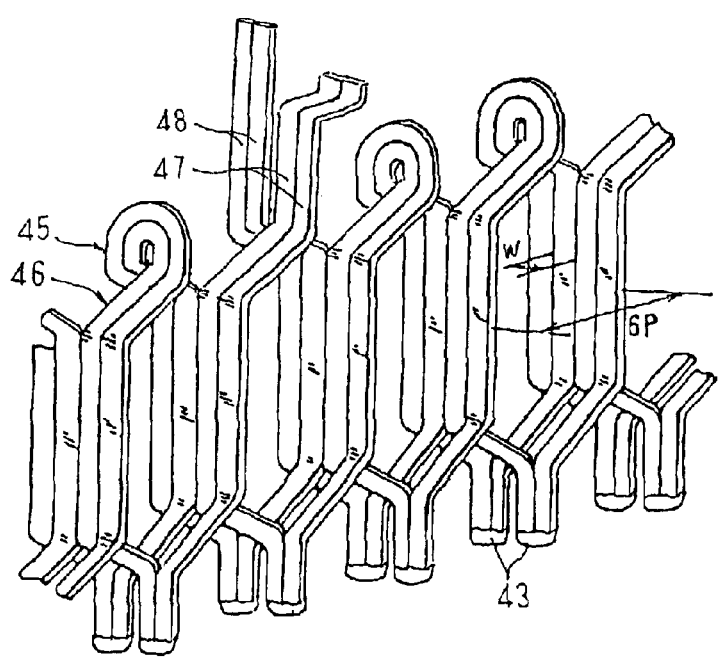
FIG. 11 is another partial perspective explaining the construction of the single winding phase sub-portion in the stator winding of the automotive alternating-current dynamoelectric machine according to Embodiment 2 of the present invention.

FIG. 8 is a perspective showing a stator of an automotive alternating-current dynamoelectric machine according to Embodiment 2 of the present invention, FIG. 9 is a rear end elevation explaining installation of a single winding phase sub-portion constituting a stator winding of the automotive alternating-current dynamoelectric machine according to Embodiment 2 of the present invention, FIGS. 10 and 11 are both partial perspectives explaining a construction of the single winding phase sub-portion in the stator winding of the automotive alternating-current dynamoelectric machine according to Embodiment 2 of the present invention, and FIG. 12 is a rear end elevation explaining connections in the stator winding in the stator of the automotive alternating-current dynamoelectric machine according to Embodiment 2 of the present invention.

Moreover, in FIG. 9, solid lines indicate rear-end wiring, broken lines indicate front-end wiring, and black circles indicate joint portions.

In FIG. 8, a stator 40 is constituted by: a stator core 41 in which a laminated body of magnetic plates is formed into a cylindrical shape; and a stator winding 42 installed in the stator core 41.

Ninety-six slots 41a are formed in the stator core 41 at a nonuniform pitch alternating between an electrical angle of 32.5 degrees and an electrical angle of 27.5 degrees in a circumferential direction so as to open onto an inner circumferential side. This stator 40 is mounted to an automotive alternator equipped with a rotor having sixteen magnetic poles, the slots 41a being formed at a ratio of two slots per phase per pole.

As described below, the stator winding 42 is constituted by a three-phase alternating-current winding in which an X-phase winding phase portion $42_X$ in which an a-phase winding phase sub-portion and a d-phase winding phase sub-portion respectively functioning as first and second stator winding phase sub-portions having a phase difference corresponding to an electrical angle of 32.5 degrees from each other are connected in series by a first joint portion $49_{a-d}$, a Y-phase winding phase portion $42_Y$ in which a b-phase winding phase sub-portion and an e-phase winding phase sub-portion respectively functioning as first and second stator winding phase sub-portions having a phase difference corresponding to an electrical angle of 32.5 degrees (32.5°) from each other are connected in series by a second joint portion $49_{b-e}$, and a Z-phase winding phase portion $42_Z$ in which a c-phase winding phase sub-portion and an f-phase winding phase sub-portion, respectively functioning as first and second stator winding phase sub-portions having a phase difference corresponding to an electrical angle of 32.5 degrees from each other are connected in series by a third joint portion $49_{c-f}$ are formed into a Y connection (an alternating-current connection).

Next, a construction of a single winding phase sub-portion constituting the stator winding 42 will be explained with reference to FIGS. 9 to 11.

A large conductor segment 45 is formed by bending a short length of copper wire having a rectangular cross section coated with an electrical insulator into a general U shape, being constructed such that a pair of large slot-accommodated portions 45a are joined by a generally V-shaped large return portion 45b.

A small conductor segment 46 is formed by bending a short length of copper wire having a rectangular cross section coated with an electrical insulator into a general U shape, being constructed such that a pair of small slot-accommodated portions 46a are joined by a generally V-shaped small return portion 46b.

Moreover, to facilitate explanation, Slot Numbers from 1 to 96 are allocated to each of the slots 41a, as shown in FIG. 9, and the positions in each of the slots 41a in which the slot-accommodated portions 45a and 46a of the conductor segments 45 and 46 are accommodated are respectively designated Address 1, Address 2, Address 3, and Address 4 from an inner circumferential side.

The small conductor segments 46 are inserted from a rear end of the stator core 41 into slot pairs separated by six slots (slot pairs including Slot Numbers n and (n+6)), corresponding to a pitch of one magnetic pole. Here, in each of the slot pairs, the small conductor segments 46 are inserted into Address 2 in Slot Number n of the slots 41a and into Address 3 in Slot Number (n+6) of the slots 41a. Next, the large conductor segments 45 are inserted from a rear end of the stator core 41 into slot pairs separated by six slots (slot pairs including Slot Numbers n and (n+6)). Here, in each of the slot pairs, the large conductor segments 45 are inserted into Address 1 in Slot Number n of the slots 41a and into Address 4 in Slot Number (n+6) of the slots 41a.

Free end portions of the large conductor segments 45 and the small conductor segments 46 projecting outward at the front end from Address 2 and Address 4 of each of the slot pairs are bent in a clockwise direction in FIG. 9, and free end portions of the large conductor segments 45 and the small conductor segments 46 projecting outward at the front end from Address 1 and Address 3 of each of the slot pairs are bent in a counterclockwise direction in FIG. 9. Here, four slot-accommodated portions 45a and 46a are accommodated in each of the slots 41a so as to line up in one column in a radial direction.

Next, the free end portions 46c of the small conductor segments 46 projecting outward at the front end from Address 2 in Slot Number n of the slots 41a and the free end portions 45c of the large conductor segments 45 projecting outward at the front end from Address 1 in Slot Number (n+6) of the slots 41a are stacked in a radial direction and joined by tungsten-inert gas (TIG) welding. Similarly, the free end portions 45c of the large conductor segments 45 projecting outward at the front end from Address 4 in Slot Number n of the slots 41a and the free end portions 46c of the small conductor segments 46 projecting outward at the front end from Address 3 in Slot Number (n+6) of the slots 41a are stacked in a radial direction and joined by TIG welding. Thus, as shown in FIG. 9, two two-turn lap windings are formed, the lap windings being wound into every sixth slot 41a. These two lap windings correspond to the single winding phase sub-portion.

Now, at the rear end of the stator core 41, coil end portions constructed into two layers such that the large return portions 45b surround the small return portions 46b are arranged in a circumferential direction at a pitch of six slots (6P), as shown in FIG. 10. On the other hand, at the front end of the stator core 41, joint portions 43 (coil end portions) of the free end portions 45c and 46c are arranged in a circumferential direction at a pitch of six slots so as to form two rows and so as to be separated and line up in single columns in a radial direction, as shown in FIG. 10.

First and second modified conductor segments 47 and 48 having a rectangular cross section are inserted only into Slot Number 1 and Slot Number 7 of the slots 41a, as shown in FIG. 11. The first modified conductor segments 47 are used for the joint portions between the winding phase sub-portions and the neutral-point connections described below, and the second modified conductor segments 48 are used as output wires.

Moreover, in FIG. 9, only one single winding phase sub-portion is shown to be installed in the stator core 41, but in reality, six single winding phase sub-portions installed in this manner are installed such that the slot groups into which each is inserted are successively offset by one slot from each other. More specifically, an a-phase winding phase sub-portion is installed in a first slot group including Slot Numbers 1, 7, etc., through 91, a d-phase winding phase sub-portion is installed in a second slot group including Slot Numbers 2, 8, etc., through 92, a c-phase winding phase sub-portion is installed in a third slot group including Slot Numbers 3, 9, etc., through 93, an f-phase winding phase sub-portion is installed in a fourth slot group including Slot Numbers 4, 10, etc., through 94, a b-phase winding phase sub-portion is installed in a fifth slot group including Slot Numbers 5, 11, etc., through 95, and an e-phase winding phase sub-portion is installed in a sixth slot group including Slot Numbers 6, 12, etc., through 96.

The a-phase winding phase sub-portion, the b-phase winding phase sub-portion, and the c-phase winding phase sub-portion have a phase difference corresponding to an electrical angle of 120 degrees from each other, and the d-phase winding phase sub-portion, the e-phase winding phase sub-portion, and the f-phase winding phase sub-portion have a phase difference corresponding to an electrical angle of 120 degrees from each other. The d-phase winding phase sub-portion, the e-phase winding phase sub-portion, and the f-phase winding phase sub-portion have a phase difference corresponding to an electrical angle of 32.5 degrees relative to the a-phase winding phase sub-portion, the b-phase winding phase sub-portion, and the c-phase winding phase sub-portion, respectively.

End portions of the first modified conductor segments 47 projecting outward at the rear end from Address 1 and Address 2 of Slot Number 1 of the slots 41a and end portions of the second modified conductor segments 48 projecting outward at the rear end from Address 3 and Address 4 of Slot Number 7 of the slots 41a constitute winding ends of the a-phase winding phase sub-portion. End portions of the first modified conductor segments 47 projecting outward at the rear end from Address 1 and Address 2 of Slot Number 8 of the slots 41a and end portions of the first modified conductor segments 47 projecting outward at the rear end from Address 3 and Address 4 of Slot Number 14 of the slots 41a constitute winding ends of the d-phase winding phase sub-portion. End portions of the first modified conductor segments 47 projecting outward at the rear end from Address 1 and Address 2 of Slot Number 11 of the slots 41a and end portions of the second modified conductor segments 48 projecting outward at the rear end from Address 3 and Address 4 of Slot Number 17 of the slots 41a constitute winding ends of the b-phase winding phase sub-portion. End portions of the first modified conductor segments 47 projecting outward at the rear end from Address 1 and Address 2 of Slot Number 18 of the slots 41a and end portions of the first modified conductor segments 47 projecting outward at the rear end from Address 3 and Address 4 of Slot Number 24 of the slots 41a constitute winding ends of the e-phase winding phase sub-portion. End portions of the first modified conductor segments 47 projecting outward at the rear end from Address 1 and Address 2 of Slot Number 21 of the slots 41a and end portions of the second modified conductor segments 48 projecting outward at the rear end from Address 3 and Address 4 of Slot Number 27 of the slots 41a constitute winding ends of the c-phase winding phase sub-portion. And end portions of the first modified conductor segments 47 projecting outward at the rear end from Address 1 and Address 2 of Slot Number 28 of the slots 41a and end portions of the first modified conductor segments 47 projecting outward at the rear end from Address 3 and Address 4 of Slot Number 34 of the slots 41a constitute winding ends of the f-phase winding phase sub-portion.

Next, as shown in FIG. 12, the first modified conductor segments 47 projecting outward at the rear end from Address 1 and Address 2 of Slot Number 1 of the slots 41a and the first modified conductor segments 47 projecting outward at the rear end from Address 1 and Address 2 of Slot Number 8 of the slots 41a are led around an upper portion of the coil end portions (the return portions 45b and 46b), and the end portions of the first modified conductor segments 47 are abutted and joined together by TIG welding, constituting a first joint portion $49_{a-d}$. Thus, an X-phase winding phase portion $42_X$ is formed, in which the a-phase winding phase sub-portion and the d-phase winding phase sub-portion are connected in series. In other words, the a-phase winding phase sub-portion and the d-phase winding phase sub-portion are zigzag-connected at an electrical angle of 32.5 degrees. The end portions of the first modified conductor segments 47 are welded by abutting together side surfaces constituted by long sides of the rectangular cross sections.

The first modified conductor segments 47 projecting outward at the rear end from Address 1 and Address 2 of Slot Number 11 of the slots 41a and the first modified conductor segments 47 projecting outward at the rear end from Address 1 and Address 2 of Slot Number 18 of the slots 41a are led around an upper portion of the coil end portions (the return portions 45b and 46b), and the end portions of the first modified conductor segments 47 are abutted and joined together by TIG welding, constituting a second joint portion $49_{b-e}$. Thus, a Y-phase winding phase portion $42_Y$ is formed, in which the b-phase winding phase sub-portion and the e-phase winding phase sub-portion are connected in series. In other words, the b-phase winding phase sub-portion and the e-phase winding phase sub-portion are zigzag-connected at an electrical angle of 32.5 degrees. The end portions of the first modified conductor segments 47 are welded by abutting together side surfaces constituted by long sides of the rectangular cross sections.

The first modified conductor segments 47 projecting outward at the rear end from Address 1 and Address 2 of Slot Number 21 of the slots 41a and the first modified conductor segments 47 projecting outward at the rear end from Address 1 and Address 2 of Slot Number 28 of the slots 41a are led around an upper portion of the coil end portions (the return portions 45b and 46b), and the end portions of the first modified conductor segments 47 are abutted and joined together by TIG welding, constituting a third joint portion $49_{c-f}$. Thus, a Z-phase winding phase portion $42_Z$ is formed, in which the c-phase winding phase sub-portion and the f-phase winding phase sub-portion are connected in series. In other words, the c-phase winding phase sub-portion and the f-phase winding phase sub-portion are zigzag-connected at an electrical angle of 32.5 degrees. The end portions of the first modified conductor segments 47 are welded by abutting together side surfaces constituted by long sides of the rectangular cross sections.

In addition, the first modified conductor segments 47 projecting outward at the rear end from Address 3 and Address 4 of Slot Number 14 of the slots 41a, the first modified conductor segments 47 projecting outward at the rear end from Address 3 and Address 4 of Slot Number 24 of the slots 41a, and the first modified conductor segments 47 projecting outward at the rear end from Address 3 and Address 4 of Slot Number 34 of the slots 41a are led around an upper portion of the coil end portions (the return portions 45b and 46b), and the end portions of the first modified conductor segments 47 are abutted and joined together by TIG welding, constituting a neutral point N. Thus, the stator winding 42 is obtained, which is composed of a three-phase alternating-current winding in which the X-phase winding phase portion $42_X$, the Y-phase winding phase portion $42_Y$, and the Z-phase winding phase portion $42_Z$ are Y-connected.

The end portions of the first modified conductor segments 47 are welded by abutting together side surfaces constituted by long sides of the rectangular cross sections.

The second modified conductor segments 48 projecting outward at the rear end from Address 3 and Address 4 of Slot Number 7 of the slots 41*a* become an output wire $O_X$ of the X-phase winding phase portion 42$_X$. The second modified conductor segments 48 projecting outward at the rear end from Address 3 and Address 4 of Slot Number 17 of the slots 41*a* become an output wire $O_Y$ of the Y-phase winding phase portion 42$_Y$. And the second modified conductor segments 48 projecting outward at the rear end from Address 3 and Address 4 of Slot Number 27 of the slots 41*a* become an output wire $O_Z$ of the Z-phase winding phase portion 42$_Z$.

The stator 40 prepared in this manner is mounted to an automotive alternating-current dynamoelectric machine, and the output wires $O_X$, $O_Y$, and $O_Z$ are connected to a rectifier 12, constituting an electrical circuit equivalent to the electrical circuit in FIG. 4.

In Embodiment 2, because the slots 41*a* are formed at a ratio of two slots per phase per pole, and the X-phase winding phase portion 42$_X$, the Y-phase winding phase portion 42$_Y$, and the Z-phase winding phase portion 42$_Z$ are constructed by connecting together in series winding phase sub-portions installed in adjacent pairs of slot groups, that is, winding phase sub-portions having a phase difference corresponding to an electrical angle of 32.5 degrees, the stator spatial fifth-order temporal negative first-order harmonic and the spatial seventh-order temporal first-order harmonic can be reduced further, thereby providing an automotive alternator having reduced electromagnetic noise and reduced vibration.

Because the pairs of winding phase sub-portions are connected in series between adjacent slots 41*a* having an electrical angle of 32.5 degrees, connection space for connecting the pairs of winding phase sub-portions in series is widened compared to conventional devices, thereby improving connection workability.

Now, results of an analytical study of stator magnetic fields using stator cores in which the nonuniform pitch angle α was 27.5 degrees, 30.0 degrees, 32.5 degrees, and 35.0 degrees are shown in FIGS. 13 and 14.

From FIGS. 13 and 14, it can be seen that the 6f electromagnetic vibrational force when α is 32.5 degrees can be reduced to 67 percent of the 6f electromagnetic vibrational force when α is 30 degrees. It can also be seen that there is no reduction in the 6f electromagnetic vibrational force when α is greater than 35.0 degrees.

Embodiment 3

Figure 15:
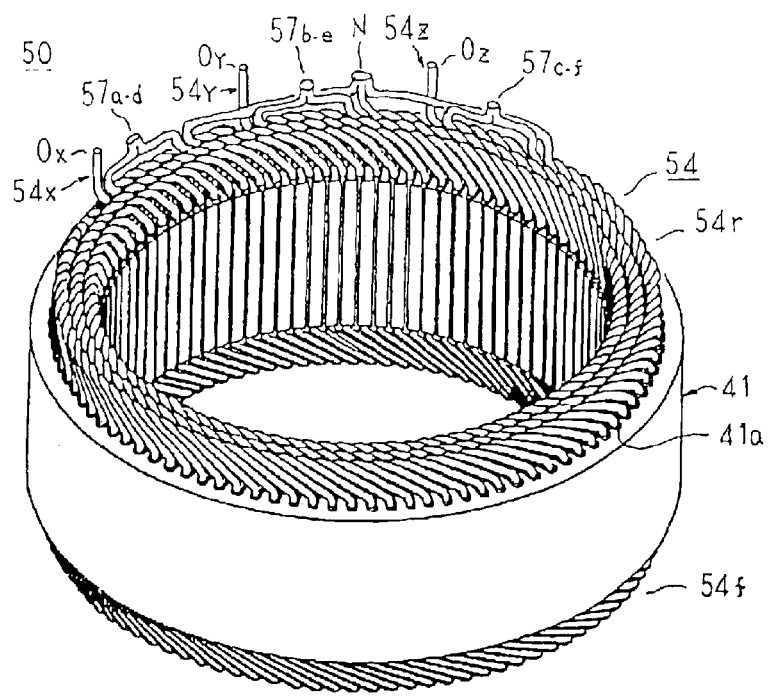
FIG. 15 is a perspective showing a stator of an automotive alternating-current dynamoelectric machine according to Embodiment 3 of the present invention.
Figure 16:
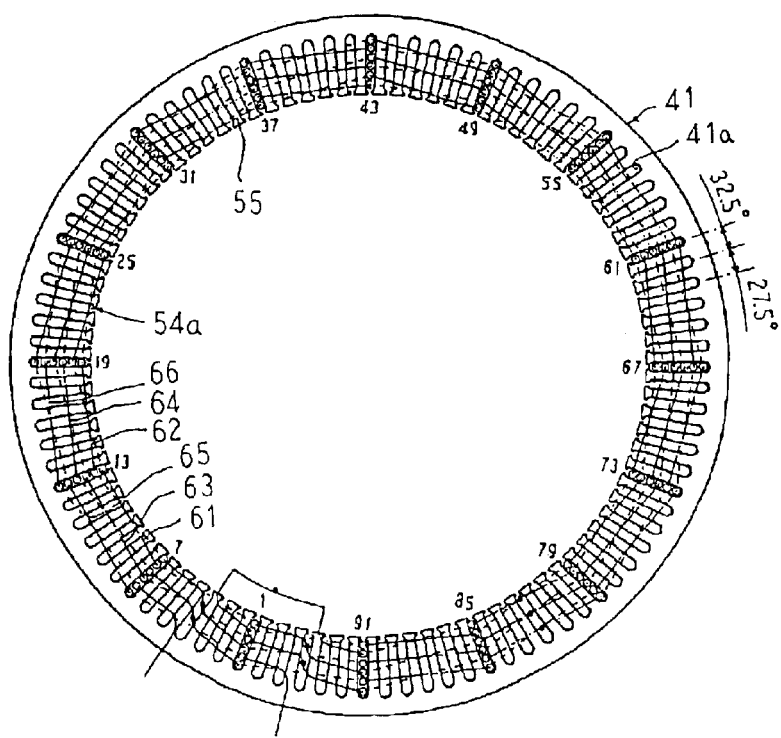
FIG. 16 is a rear end elevation explaining installation of a single winding phase sub-portion constituting a stator winding of the automotive alternating-current dynamoelectric machine according to Embodiment 3 of the present invention.

FIG. 15 is a perspective showing a stator of an automotive alternating-current dynamoelectric machine according to Embodiment 3 of the present invention, and FIG. 16 is a rear end elevation explaining installation of a single winding phase sub-portion constituting a stator winding of the automotive alternating-current dynamoelectric machine according to Embodiment 3 of the present invention. Moreover, in FIG. 16, solid lines indicate rear-end wiring, broken lines indicate front-end wiring, and black circles indicate joint portions. Slots 41*a* are formed in the stator core 41 at a ratio of two slots per phase per pole at a nonuniform pitch alternating between an electrical angle of 32.5 degrees and an electrical angle of 27.5 degrees.

A construction of a single winding phase sub-portion constituting a stator winding 54 according to Embodiment 3 will be explained with reference to FIG. 16.

An a-phase winding phase sub-portion 54*a* is constituted by first to sixth wave winding sub-portions 61 to 66 each composed of one conductor wire 55 composed of a continuous copper wire having a rectangular cross section coated with an electrical insulator. The first wave winding sub-portion 61 is constructed by wave winding one conductor wire 55 so as to alternately occupy Address 1 and Address 2 in every sixth slot 41*a* from Slot Numbers 1 to 91. The second wave winding sub-portion 62 is constructed by wave winding one conductor wire 55 so as to alternately occupy Address 2 and Address 1 in every sixth slot 41*a* from Slot Numbers 1 to 91. The third wave winding sub-portion 63 is constructed by wave winding one conductor wire 55 so as to alternately occupy Address 3 and Address 4 in every sixth slot 41*a* from Slot Numbers 1 to 91. The fourth wave winding sub-portion 64 is constructed by wave winding one conductor wire 55 so as to alternately occupy Address 4 and Address 3 in every sixth slot 41*a* from Slot Numbers 1 to 91. The fifth wave winding sub-portion 65 is constructed by wave winding one conductor wire 55 so as to alternately occupy Address 5 and Address 6 in every sixth slot 41*a* from Slot Numbers 1 to 91. The sixth wave winding sub-portion 66 is constructed by wave winding one conductor wire 55 so as to alternately occupy Address 6 and Address 5 in every sixth slot 41*a* from Slot Numbers 1 to 91. In each of the slots 41*a*, six conductor wires 55 are arranged so as to line up in one column in a radial direction with longitudinal axes of their rectangular cross sections aligned radially.

Moreover, the first to sixth wave winding sub-portions 61 to 66 are each formed into single-turn wave windings by joining together first and second ends of the conductor wires 55 by TIG welding. The second wave winding sub-portion 62, the fourth wave winding sub-portion 64, and the sixth wave winding sub-portion 66 are offset by an electrical angle of 180 degrees so as to be inversely wound relative to the first wave winding sub-portion 61, the third wave winding sub-portion 63, and the fifth wave winding sub-portion 65, respectively.

At the rear end of the stator core 41, portions of the conductor wires 55 of the first, third, and fifth wave winding sub-portions 61, 63, and 65 projecting outward from Slot Number 91 and Slot Number 1 of the slots 41*a* are cut, and portions of the conductor wires 55 of the second, fourth, and sixth wave winding sub-portions 62, 64, and 66 projecting outward from Slot Number 1 and Slot Number 7 of the slots 41*a* are cut. Next, the cut end of the third wave winding sub-portion 63 projecting outward from Address 4 of Slot Number 91 of the slots 41*a*, and the cut end of the first wave winding sub-portion 61 projecting outward from Address 1 of Slot Number 1 of the slots 41*a* are joined together by TIG welding. The cut end of the fifth wave winding sub-portion 65 projecting outward from Address 6 of Slot Number 91 of the slots 41*a*, and the cut end of the third wave winding sub-portion 63 projecting outward from Address 3 of Slot Number 1 of the slots 41*a* are joined together by TIG welding. The cut end of the fourth wave winding sub-portion 64 projecting outward from Address 4 of Slot Number 1 of the slots 41*a*, and the cut end of the second wave winding sub-portion 62 projecting outward from Address 1 of Slot Number 7 of the slots 41*a* are joined together by TIG welding. The cut end of the sixth wave winding sub-portion 66 projecting outward from Address 6 of Slot Number 1 of the slots 41*a*, and the cut end of the fourth wave winding sub-portion 64 projecting outward from Address 3 of Slot Number 7 of the slots 41*a* are joined together by TIG welding. And the cut end of the first wave winding sub-portion 61 projecting outward from Address 2 of Slot Number 91 of the slots 41*a*, and the cut end of the second wave winding sub-portion 62 projecting outward from Address 2 of Slot Number 1 of the slots 41*a* are joined together by TIG welding. Thus, a six-turn wave winding (the a-phase winding phase sub-portion 54*a*) is formed, in which the first to sixth wave winding sub-portions 61 to 66 are connected in series. The cut end of the fifth wave winding sub-portion 65 projecting outward from Address 5 of Slot Number 1 of the slots 41*a* and the cut end of the sixth wave winding sub-portion 66 projecting outward from Address 5 of Slot Number 7 of the slots 41*a* become first and second end portions of the a-phase winding phase sub-portion 54*a*.

A d-phase winding phase sub-portion, a c-phase winding phase sub-portion, an f-phase winding phase sub-portion, a b-phase winding phase sub-portion, and an e-phase winding phase sub-portion are formed in a similar manner such that the slot groups into which the conductor wires 55 of each winding phase sub-portion are installed are successively offset by one slot from each other.

Moreover, the a-phase winding phase sub-portion 54*a* is installed in a first slot group including Slot Numbers 1, 7, etc., through 91, the d-phase winding phase sub-portion is installed in a second slot group including Slot Numbers 2, 8, etc., through 92, the c-phase winding phase sub-portion is installed in a third slot group including Slot Numbers 3, 9, etc., through 93, the f-phase winding phase sub-portion is installed in a fourth slot group including Slot Numbers 4, 10, etc., through 94, the b-phase winding phase sub-portion is installed in a fifth slot group including Slot Numbers 5, 11, etc., through 95, and the e-phase winding phase sub-portion is installed in a sixth slot group including Slot Numbers 6, 12, etc., through 96. The d-phase winding phase sub-portion, the e-phase winding phase sub-portion, and the f-phase winding phase sub-portion have a phase difference corresponding to an electrical angle of 32.5 degrees relative to the a-phase winding phase sub-portion 54*a*, the b-phase winding phase sub-portion, and the c-phase winding phase sub-portion, respectively.

Here, the cut end of the fifth wave winding sub-portion 65 projecting outward from Address 5 of Slot Number 2 of the slots 41*a* and the cut end of the sixth wave winding sub-portion 66 projecting outward from Address 5 of Slot Number 8 of the slots 41*a* become first and second end portions of the d-phase winding phase sub-portion. The cut end of the fifth wave winding sub-portion 65 projecting outward from Address 5 of Slot Number 11 of the slots 41*a* and the cut end of the sixth wave winding sub-portion 66 projecting outward from Address 5 of Slot Number 17 of the slots 41*a* become first and second end portions of the b-phase winding phase sub-portion. The cut end of the fifth wave winding sub-portion 65 projecting outward from Address 5 of Slot Number 12 of the slots 41*a* and the cut end of the sixth wave winding sub-portion 66 projecting outward from Address 5 of Slot Number 18 of the slots 41*a* become first and second end portions of the e-phase winding phase sub-portion. The cut end of the fifth wave winding sub-portion 65 projecting outward from Address 5 of Slot Number 21 of the slots 41*a* and the cut end of the sixth wave winding sub-portion 66 projecting outward from Address 5 of Slot Number 27 of the slots 41*a* become first and second end portions of the c-phase winding phase sub-portion. The cut end of the fifth wave winding sub-portion 65 projecting outward from Address 5 of Slot Number 22 of the slots 41*a* and the cut end of the sixth wave winding sub-portion 66 projecting outward from Address 5 of Slot Number 28 of the slots 41*a* become first and second end portions of the f-phase winding phase sub-portion.

Next, the cut end of the fifth wave winding sub-portion 65 projecting outward from Address 5 of Slot Number 2 of the slots 41*a* and the cut end of the sixth wave winding sub-portion 66 projecting outward from Address 5 of Slot Number 7 of the slots 41*a* are led around an upper portion of the coil end portions, and the end portions are abutted and joined together by TIG welding, constituting a first joint portion $57_{a\text{-}d}$. Thus, an X-phase winding phase portion $54_X$ is formed, in which the a-phase winding phase sub-portion and the d-phase winding phase sub-portion are connected in series. In other words, the a-phase winding phase sub-portion and the d-phase winding phase sub-portion, respectively functioning as first and second stator winding phase sub-portions, are zigzag-connected at an electrical angle of 32.5 degrees.

The cut end of the fifth wave winding sub-portion 65 projecting outward from Address 5 of Slot Number 12 of the slots 41*a* and the cut end of the sixth wave winding sub-portion 66 projecting outward from Address 5 of Slot Number 17 of the slots 41*a* are led around an upper portion of the coil end portions, and the end portions are abutted and joined together by TIG welding, constituting a second joint portion $57_{b\text{-}e}$. Thus, an Y-phase winding phase portion $54_Y$ is formed, in which the b-phase winding phase sub-portion and the e-phase winding phase sub-portion are connected in series. In other words, the b-phase winding phase sub-portion and the e-phase winding phase sub-portion, respectively functioning as first and second stator winding phase sub-portions, are zigzag-connected at an electrical angle of 32.5 degrees.

The cut end of the fifth wave winding sub-portion 65 projecting outward from Address 5 of Slot Number 22 of the slots 41*a* and the cut end of the sixth wave winding sub-portion 66 projecting outward from Address 5 of Slot Number 27 of the slots 41*a* are led around an upper portion of the coil end portions, and the end portions are abutted and joined together by TIG welding, constituting a third joint portion $57_{c\text{-}f}$. Thus, an Z-phase winding phase portion $54_Z$ is formed, in which the c-phase winding phase sub-portion and the f-phase winding phase sub-portion are connected in series. In other words, the c-phase winding phase sub-portion and the f-phase winding phase sub-portion, respectively functioning as first and second stator winding phase sub-portions, are zigzag-connected at an electrical angle of 32.5 degrees.

The cut end of the sixth wave winding sub-portion 66 projecting outward from Address 5 of Slot Number 8 of the slots 41*a*, the cut end of the sixth wave winding sub-portion 66 projecting outward from Address 5 of Slot Number 18 of the slots 41*a*, and the cut end of the sixth wave winding sub-portion 66 projecting outward from Address 5 of Slot Number 28 of the slots 41*a* are led around an upper portion of the coil end portions, and the end portions are abutted and joined together by TIG welding, constituting a neutral point N. Thus, the stator winding 54 is obtained, which is composed of a three-phase alternating-current winding in which the X-phase winding phase portion $54_X$, the Y-phase winding phase portion $54_Y$, and the Z-phase winding phase portion $54_Z$ are Y-connected.

The cut end of the fifth wave winding sub-portion 65 projecting outward from Address 5 of Slot Number 1 of the slots 41*a* becomes an output wire $O_X$ of the X-phase winding phase portion $54_X$. The cut end of the fifth wave winding sub-portion 65 projecting outward from Address 5 of Slot Number 11 of the slots 41*a* becomes an output wire $O_Y$ of the Y-phase winding phase portion $54_Y$. The cut end of the fifth wave winding sub-portion 65 projecting outward from Address 5 of Slot Number 21 of the slots 41*a* becomes an output wire $O_Z$ of the Z-phase winding phase portion $54_Z$.

A stator 50 prepared in this manner is mounted to an automotive alternating-current dynamoelectric machine, and the output wires $O_X$, $O_Y$, and $O_Z$ are connected to a rectifier 12, constituting an electrical circuit equivalent to the electrical circuit in FIG. 4.

Figure 17:
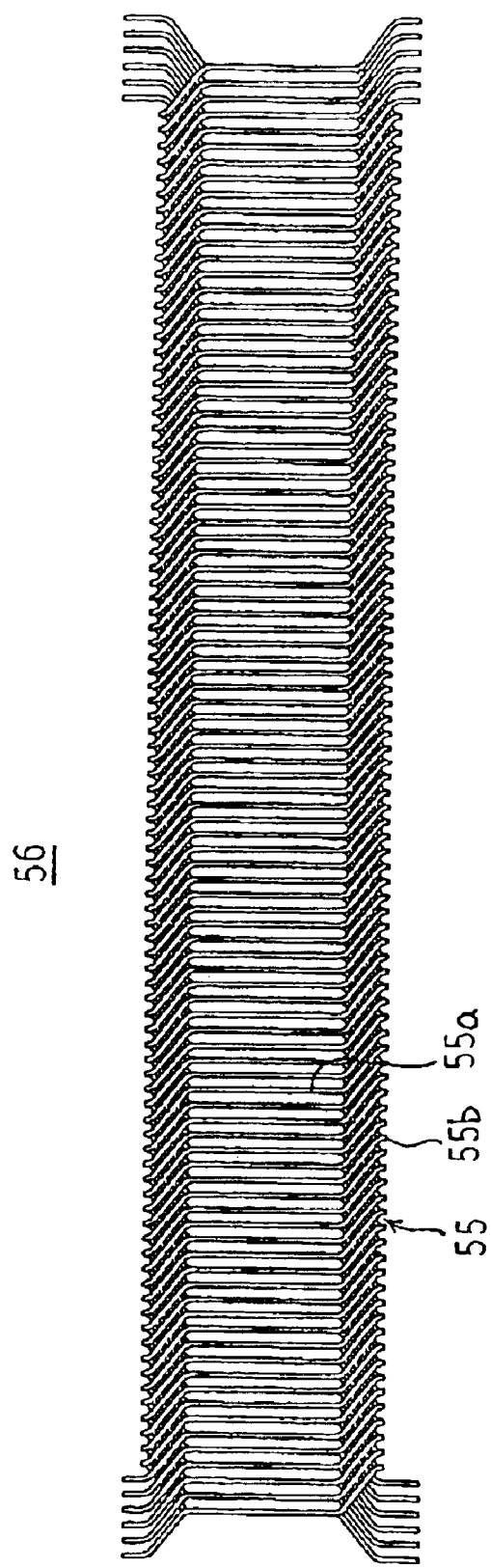
FIG. 17 is a plan showing a winding assembly constituting the stator winding of the automotive alternating-current dynamoelectric machine according to Embodiment 3 of the present invention.

Now, the stator winding 54 can be constructed using a winding assembly 56 such as shown in FIG. 17.

This winding assembly 56 is prepared by simultaneously folding twelve conductor wires 55 arranged parallel to each other at a pitch of one slot into a lightning shape on a common plane.

Figure 18:
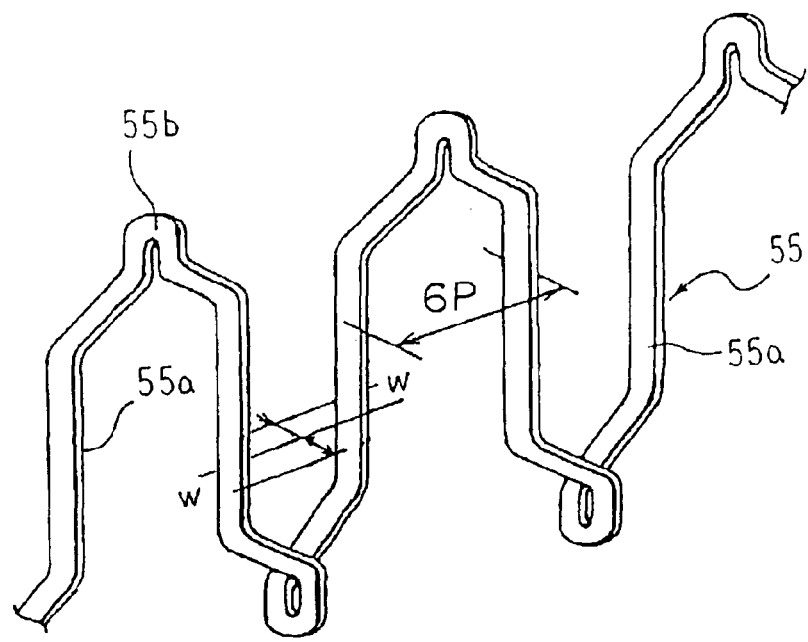
FIG. 18 is a perspective explaining part of a conductor wire constituting the winding assembly shown in FIG. 17.

As shown in FIG. 18, each of the conductor wires 55 folded into the lightning shape is shaped by bending into a planar pattern in which straight slot-accommodated portions 55a joined by return portions 55b are arranged at a pitch of six slots (6P). Adjacent pairs of the slot-accommodated portions 55a are offset by the return portions 55b by a width (w) of the conductor wires 55.

Figure 19:
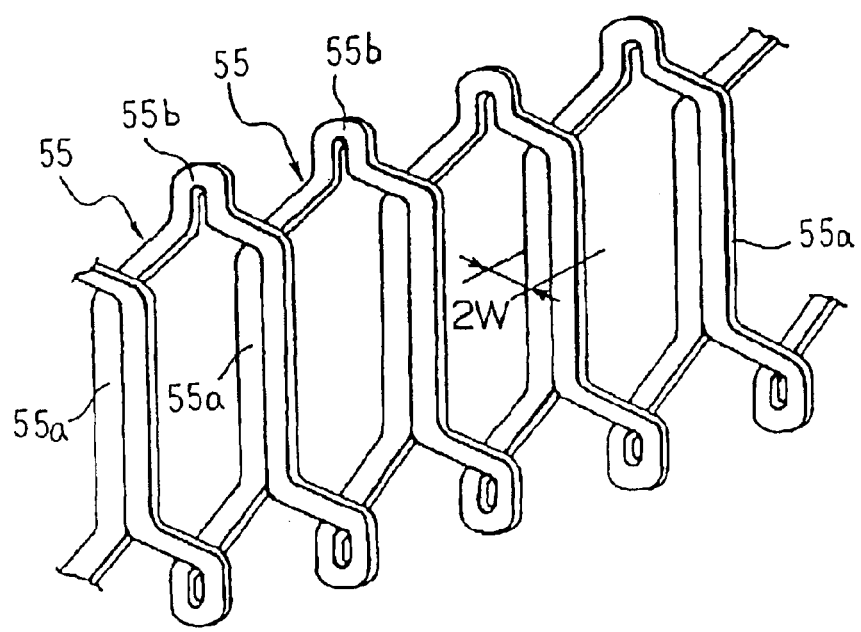
FIG. 19 is a perspective explaining arrangement of conductor wires constituting the winding assembly shown in FIG. 17.

Six pairs of conductor wires 55 in each of which two of the conductor wires 55 shaped by bending in this manner are offset by a pitch of six slots with slot-accommodated portions 55a stacked as shown in FIG. 19 are arranged so as to be offset by a pitch of one slot from each other to constitute the winding assembly 56.

Three winding assemblies 56 constructed in this manner are stacked in three layers and mounted to the stator core 41. Each of the conductor wires 55 is installed so as to alternately occupy an inner layer and an outer layer in a slot depth direction in the slots 41a in every sixth slot, constituting the first to sixth wave winding sub-portions 61 to 66 in FIG. 16. The a-phase winding phase sub-portion, the b-phase winding phase sub-portion, the c-phase winding phase sub-portion, the d-phase winding phase sub-portion, the e-phase winding phase sub-portion, and the f-phase winding phase sub-portion each composed of a six-turn wave winding in which the first to sixth wave winding sub-portions 61 to 66 are connected in series are constructed by making connections based on the connection method shown in FIG. 16.

In Embodiment 3, because the slots 41a are formed at a ratio of two slots per phase per pole, and the X-phase winding phase portion $54_X$, the Y-phase winding phase portion $54_Y$, and the Z-phase winding phase portion $54_Z$ are constructed by connecting together in series winding phase sub-portions having a phase difference corresponding to an electrical angle of 32.5 degrees (32.5°), the stator spatial fifth-order temporal negative first-order harmonic and the spatial seventh-order temporal first-order harmonic can also be reduced further, thereby providing an automotive alternator having reduced electromagnetic noise and reduced vibration.

Because the pairs of winding phase sub-portions are connected in series between adjacent slots 41a having an electrical angle of 32.5 degrees, connection space for connecting the pairs of winding phase sub-portions in series is widened compared to conventional devices, thereby improving connection workability.

Because the stator winding 54 is constituted by the winding assemblies 56, at first and second ends of the stator core 41, return portions 55b (coil end portions) formed into a uniform shape are separated from each other in a radial direction and circumferential direction and arranged neatly so as to form three rows in a circumferential direction at a pitch of one slot and be stacked in single columns in a radial direction, constituting front-end and rear-end coil ends 54f and 54r, which are in an aligned state. Consequently, rigidity of the stator 50 is increased, further reducing electromagnetic noise and vibration.

Embodiment 4

Figure 20:
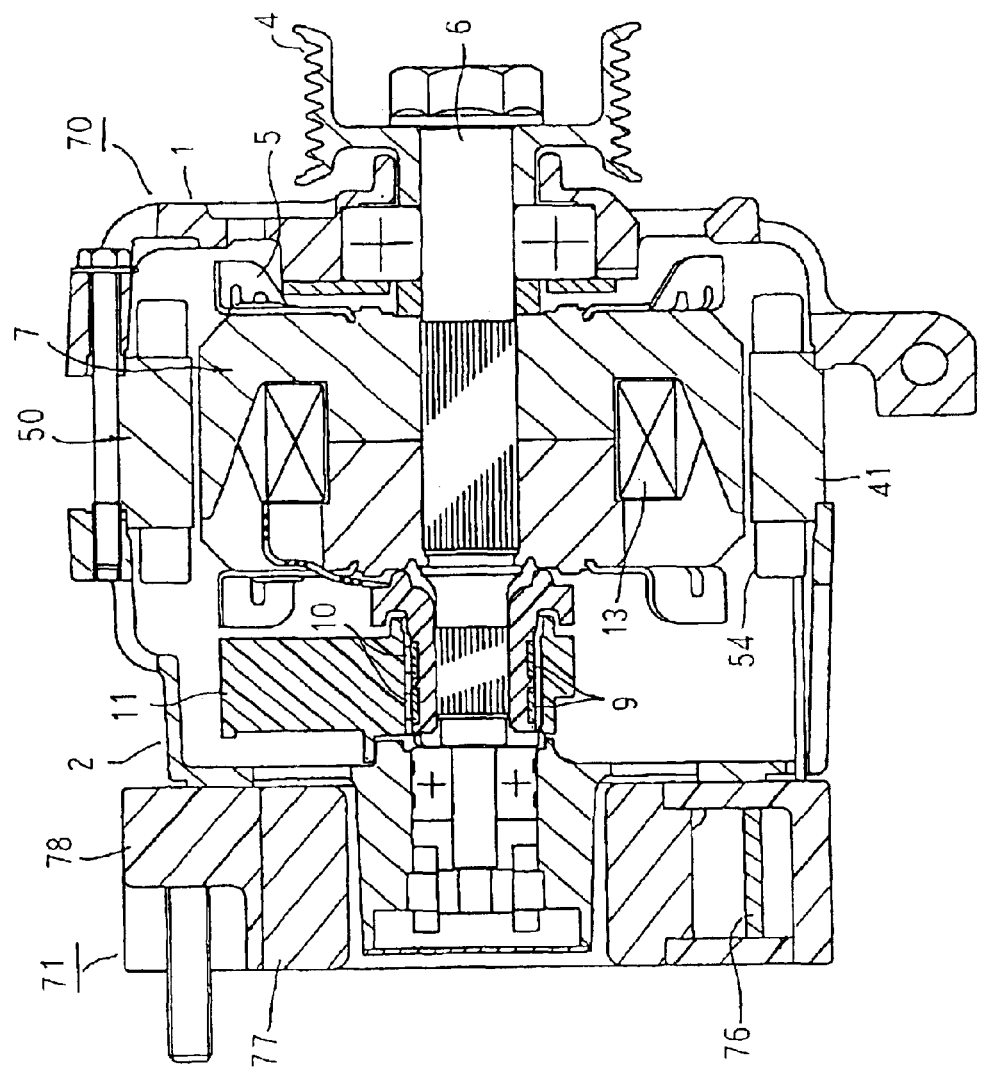
FIG. 20 is a longitudinal section showing an automotive alternating-current dynamoelectric machine according to Embodiment 4 of the present invention.
Figure 21:
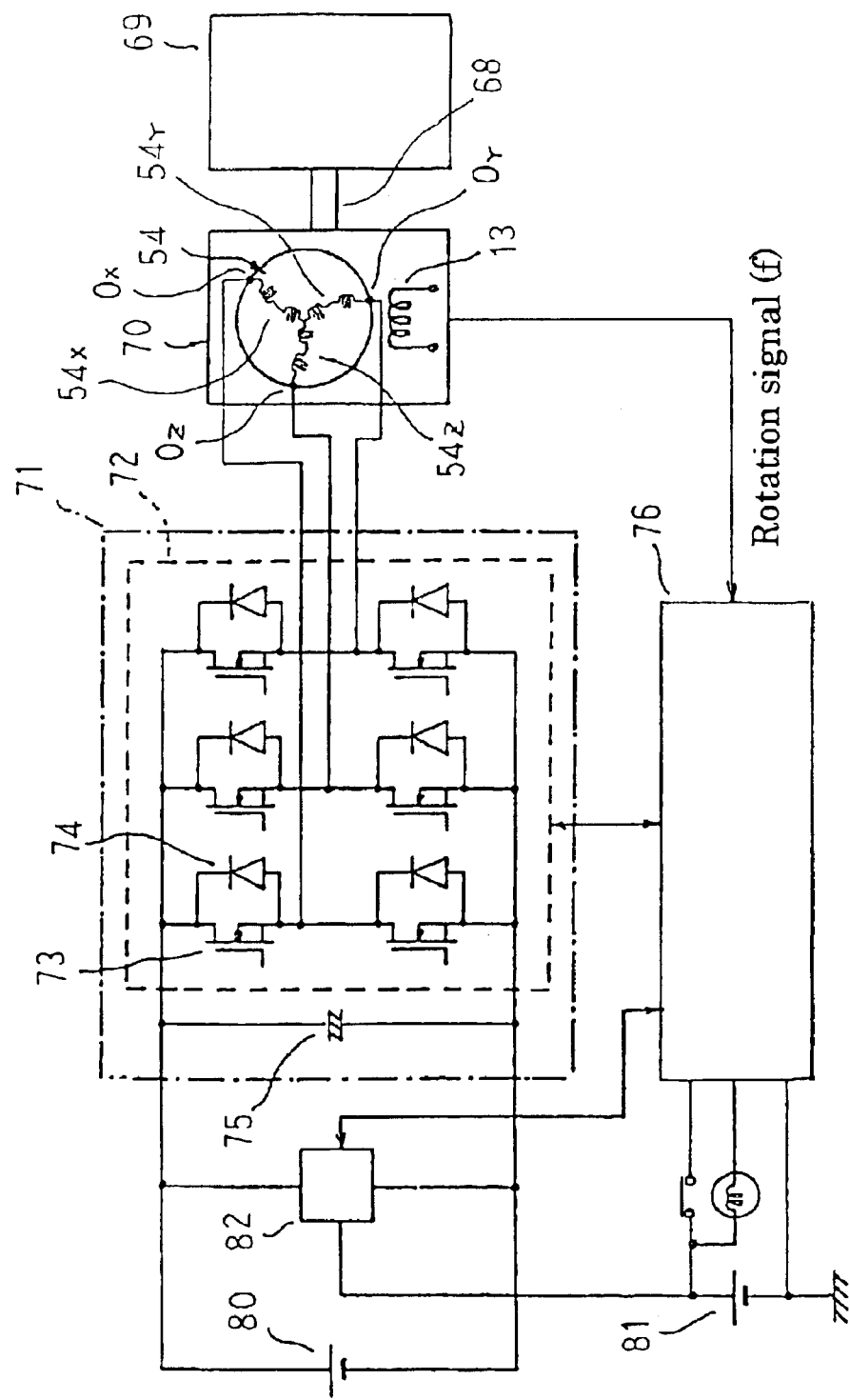
FIG. 21 is a circuit diagram showing an electrical circuit in the automotive alternating-current dynamoelectric machine according to Embodiment 4 of the present invention.
Figure 22:
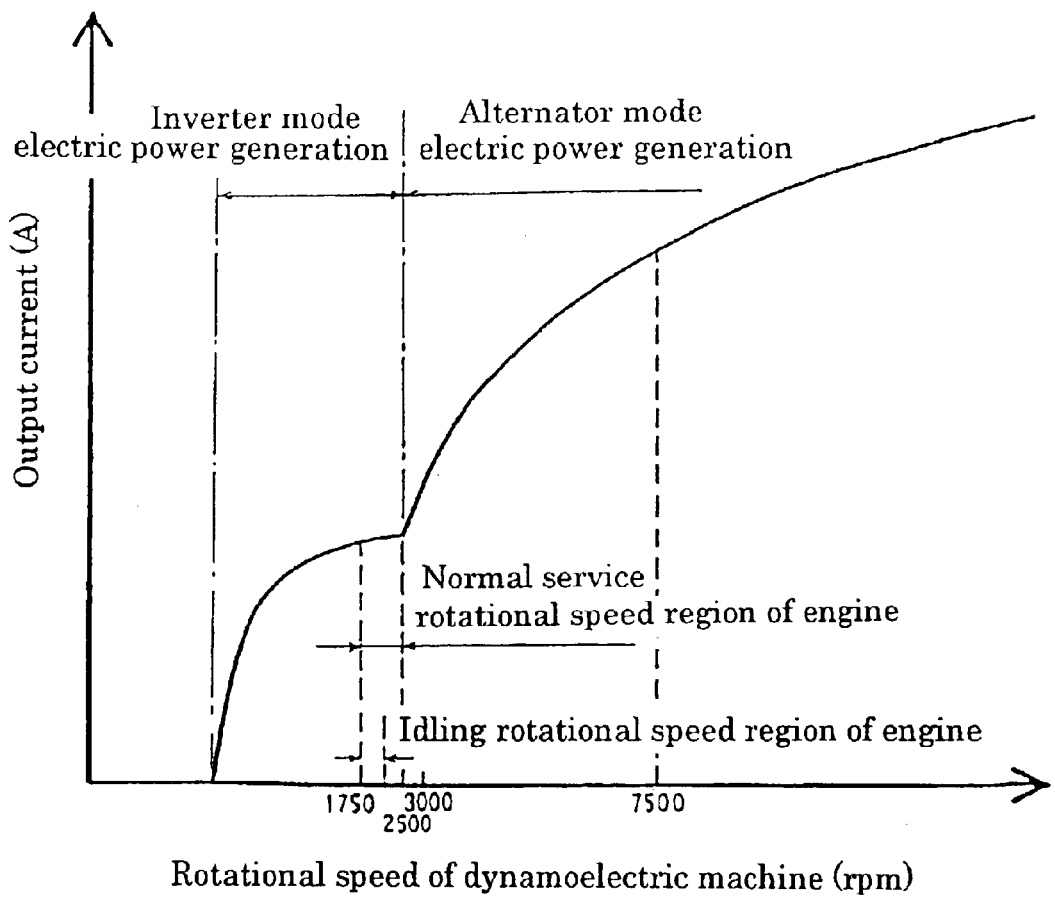
FIG. 22 is a graph showing electric power output characteristics of the automotive alternating-current dynamoelectric machine according to Embodiment 4 of the present invention.
Figure 23:
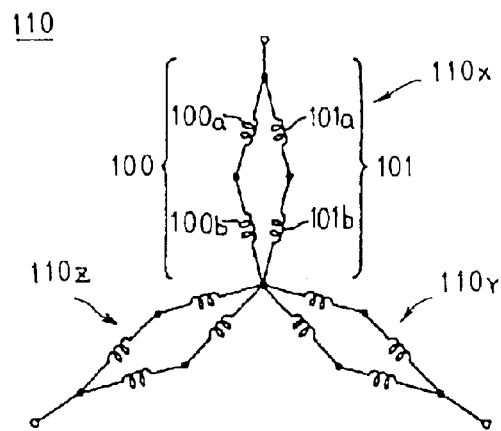
FIG. 23 is a diagram explaining a connection construction of a stator winding in a conventional automotive alternating-current dynamoelectric machine.

FIG. 20 is a longitudinal section showing an automotive alternating-current dynamoelectric machine according to Embodiment 4 of the present invention, FIG. 21 is a circuit diagram showing an electrical circuit in the automotive alternating-current dynamoelectric machine according to Embodiment 4 of the present invention, and FIG. 22 is a graph showing electric power output characteristics of the automotive alternating-current dynamoelectric machine according to Embodiment 4 of the present invention.

In FIGS. 20 and 21, an automotive alternating-current dynamoelectric machine 70 is a belt-driven dynamoelectric machine, a rotor 7 being fixed to a shaft 8 and rotatably supported in a front bracket 1 and a rear bracket 2, and a stator 50 being mounted by being held between the front bracket 1 and the rear bracket 2 so as to surround the rotor 7. A pair of slip rings 9 are mounted to a rear end of the shaft 6, a brush holder 11 is mounted to an inner wall surface of the rear bracket 2 so as to be positioned on an outer periphery at the rear end of the shaft 6, and a pair of brushes 10 are disposed inside the brush holder 11 so as to slide in contact with the slip rings 9. This automotive alternating-current dynamoelectric machine 70 is linked to an engine 69 by means of a pulley 4 and a belt 68.

An inverter unit 71 is mounted to an inner wall surface of the rear bracket 2 so as to be positioned on an outer periphery at a rear end portion of the shaft 6. The inverter unit 71 is provided with: an inverter module 72 composed of six switching elements 73, and diodes 74 connected in parallel with each of the switching elements 73; a capacitor 75 connected in parallel to the inverter module 72; and a control circuit board 76 functioning as a control apparatus mounted with electronic components for controlling switching on and off of the switching elements 73. The capacitor 75 serves a role of smoothing the electric current flowing through the inverter module 6.

The inverter module 72 is constructed by forming element-diode sets each constituted by a switching element 73 and a diode 74 connected in parallel, connecting pairs of element-diode sets in series, and mounting three such pairs on a heat sink 77 so as to be disposed in parallel. The control circuit board 76 is housed inside a resin-molded portion 78 molded integrally with the heat sink 77 using an electrically-insulating resin. Each of the output wires $O_X$, $O_Y$, and $O_Z$ of a stator winding 54 is connected to a respective intermediate point between the switching elements 73 connected in series.

The switching operation of the switching elements 73 in the inverter module 72 is controlled by the control circuit board 76. When electric power is supplied, the automotive alternating-current dynamoelectric machine 70 operates as an electric starter motor to start the engine 69. After the engine 69 has started, the automotive alternating-current dynamoelectric machine 70 is driven by the engine 69 and operates as an alternator, generating a three-phase alternating-current voltage.

In addition, a 36-volt first battery 80 constituting a driving electric power supply for the automotive alternating-current dynamoelectric machine 70 is connected in parallel to the inverter module 72. The automotive alternating-current dynamoelectric machine 70 is operated at high voltage (36 V) by the first battery 80. Since the electrical machinery load mounted to an automotive vehicle is generally rated at 12 V, a 12-volt second battery 81 is also mounted. Thus, a direct-current-to-direct-current (DC-to-DC) converter 82 is connected in parallel to the inverter module 72 to enable the second battery 81 to be charged.

In Embodiment 4, the control circuit mounted to the control circuit board 76 controls switching on and off of each of the switching elements 73 to generate three-phase alternating-current electric power from the direct-current electric power from the first battery 80. This three-phase alternating-current electric power is supplied to the stator winding 54, imparting a rotating magnetic field to a field winding 13 of the rotor 7 and driving the rotor to rotate. Then, torque from the rotor 7 is transferred to the engine 69 by means of the pulley 4 and the belt 68, driving the engine 69 to rotate, that is, starting the engine 69.

Once the engine 69 has been started, torque from the engine 69 is transferred to the shaft 6 by means of the belt 68 and the pulley 4. Thus, the rotor 7 is driven to rotate, inducing a three-phase alternating-current voltage in the stator winding 54. The control circuit monitors the rotational speed of the rotor 7 based on a rotation signal (f) and, as shown in FIG. 22, when the rotational speed is less than 2,500 rpm, controls the switching on and off of each of the switching elements 73 to make the automotive alternating-current dynamoelectric machine 70 generate electricity in the inverter mode. As shown in FIG. 22, when the rotational speed reaches 2,500 rpm, each of the switching elements 73 is switched off to make the automotive alternating-current dynamoelectric machine 70 generate electricity in the alternator mode. In this generating state, the inverter module 72 becomes a three-phase full-wave rectifier circuit in which sets of two diodes 74 are connected in series and three such sets are connected in parallel, the three-phase alternating-current voltage induced in the stator winding 54 being converted into a direct current by the inverter unit 71. The first battery 80 is charged by the direct-current electric power rectified by the inverter unit 71. The direct-current electric power rectified by the inverter unit 71 is also converted to 12 V by the DC-to-DC converter 82 and supplied to the second battery 81.

Here, the torque transmission pulley ratio is around 2.5, and given that the normal service rotational speed of a conventional engine is 700 to 1,000 rpm, the normal rotational speed of the automotive alternating-current dynamoelectric machine 70 is 1,750 to 2,500 rpm.

Thus, by operating the automotive alternating-current dynamoelectric machine 70 in the inverter mode electric power generation at the low-speed rotation end, where there are resonance points in the stator 50, electromagnetic noise is aggravated, and electromagnetic vibrations are excited.

However, because the slots 41a are formed at a ratio of two slots per phase per pole, and the X-phase winding phase portion $54_X$, the Y-phase winding phase portion $54_Y$, and the Z-phase winding phase portion $54_Z$ are constructed by connecting together in series winding phase sub-portions having a phase difference corresponding to an electrical angle of 32.5 degrees (32.5°), spatial fifth-order temporal negative first-order harmonic and the spatial seventh-order temporal first-order harmonic of the stator 50 are reduced, enabling electromagnetic noise and vibration to be reduced. As a result, an automotive alternating-current dynamoelectric machine is provided enabling the occurrence of unpleasant noise to be suppressed and the service life of the belt 68 to be extended.

Moreover, in Embodiment 4 above, the stator 50 according to Embodiment 3 above is used, but similar effects can also be achieved using the stator 8 or 40 according to Embodiments 1 or 2 above.

What is claimed is:

1. An automotive alternating-current dynamoelectric machine comprising:

a stator having:

an annular stator core in which slots are disposed at a ratio of two slots per phase per pole; and a three-phase stator winding mounted to said stator core, and a rotor rotatably disposed inside said stator for generating a magnetic flux, wherein:

an X-phase winding phase portion, a Y-phase winding phase portion, and a Z-phase winding phase portion constituting said three-phase stator winding are each constructed by connecting in series first and second stator winding phase sub-portions installed in an adjacent pair of slot groups, said slots being formed at a nonuniform pitch in which an angle between center lines of slot opening portions alternates between an electrical angle of $\alpha$ and an electrical angle of $(60°-\alpha)$, where $\alpha$ does not equal 30 degrees.

2. The automotive alternating-current dynamoelectric machine according to claim 1, wherein:

said first and second stator winding phase sub-portions connected in series are installed in said adjacent pair of said slot groups in which said angle between said center lines of said slot opening portions is $\alpha$, $\alpha$ being greater than $(60°-\alpha)$.

3. The automotive alternating-current dynamoelectric machine according to claim 2, wherein:

a phase difference $\alpha$ between said first stator winding phase sub-portion and said second stator winding phase sub-portion connected in series is set such that $\alpha$ is greater than an electrical angle of 30 degrees and less than an electrical angle of 35 degrees.

4. The automotive alternating-current dynamoelectric machine according to claim 3, wherein:

said phase difference $\alpha$ between said first stator winding phase sub-portion and said second stator winding phase sub-portion connected in series is set to an electrical angle of approximately 32.5 degrees.

5. The automotive alternating-current dynamoelectric machine according to claim 1, wherein:

said dynamoelectric machine is linked to an engine by means of a pulley and a belt, said dynamoelectric machine being constructed so as to operate as an electric starter motor for starting said engine and as a generator for generating electric power driven by said engine.

6. The automotive alternating-current dynamoelectric machine according to claim 5, wherein:

said dynamoelectric machine is constructed so as to have an electric power generating mode in which said dynamoelectric machine is controlled by an inverter to generate electric power in a low-speed rotational region when operating as said generator.

* * * * *